US009501559B2

(12) United States Patent
Misra et al.

(10) Patent No.: US 9,501,559 B2
(45) Date of Patent: Nov. 22, 2016

(54) USER-GUIDED SEARCH QUERY EXPANSION

(71) Applicant: Accenture Global Services Limited, Dublin (IE)

(72) Inventors: Janardan Misra, Uttarakhand (IN); Subhabrata Das, West Bengal (IN)

(73) Assignee: Accenture Global Services Limited, Dublin (IE)

( * ) Notice: Subject to any disclaimer, the term of this patent is extended or adjusted under 35 U.S.C. 154(b) by 240 days.

(21) Appl. No.: 14/253,585

(22) Filed: Apr. 15, 2014

(65) Prior Publication Data

US 2015/0242493 A1   Aug. 27, 2015

(30) Foreign Application Priority Data

Feb. 27, 2014 (IN) ............................ 1007/CHE/2014

(51) Int. Cl.
*G06F 17/30* (2006.01)
*G06F 15/16* (2006.01)

(52) U.S. Cl.
CPC ... *G06F 17/30672* (2013.01); *G06F 17/30646* (2013.01)

(58) Field of Classification Search
CPC ................................................. G06F 17/30646
See application file for complete search history.

(56) References Cited

U.S. PATENT DOCUMENTS

| 2007/0282811 A1* | 12/2007 | Musgrove | G06F 17/30672 |
| 2009/0083255 A1* | 3/2009 | Li | G06F 17/273 |
| 2009/0089286 A1* | 4/2009 | Kumar | G06F 17/30867 |
| 2009/0198672 A1* | 8/2009 | Jones | G06F 17/30672 |
| 2009/0248665 A1* | 10/2009 | Garg | G06F 17/30654 |
| 2013/0254155 A1 | 9/2013 | Thollot et al. | |

OTHER PUBLICATIONS

Andy Garron et al., "Latent Semantic Indexing with Selective Query Expansion", http://trec.nist.gov/pubs/trec20/papers/Ursinus. legal.update.pdf, 2012, 10 pages.
Giorgos Akrivas et al., "Context—Sensitive Semantic Query Expansion", 2002 IEEE International Conference on Artificial Intelligence Systems, 2002, 6 pages.
(Continued)

*Primary Examiner* — Alex Gofman
(74) *Attorney, Agent, or Firm* — Harrity & Harrity, LLP

(57) ABSTRACT

A device may receive information that identifies a search query to be used to search a text. The device may provide information that identifies multiple search query expansion techniques for expanding the search query. The device may receive a selection of one or more search query expansion techniques, of the multiple search query expansion techniques, to be performed to expand the search query. The device may perform the one or more search query expansion techniques to generate a set of expanded search queries based on the search query and the text. The device may search the text, using the set of expanded search queries, to identify multiple sections of the text that include an expanded search query included in the set of expanded search queries. The device may provide search results that identify the multiple sections of the text based on searching the text.

20 Claims, 20 Drawing Sheets

(56) References Cited

OTHER PUBLICATIONS

Min Song et al., "Ontologies-driven Semantic Query Expansion", http://www.cis.drexel.edu/faculty/thu/research-papers/song_dek_2006.pdf, 2006, 15 pages.

Saeedeh Shekarpour et al., "Keyword Query Expansion on Linked Data Using Linguistic and Semantic Features", 7th IEEE International Conference on Semantic Computing, Sep. 16-18, 2013, 7 pages.

Apostol Natsev et al., "Semantic Concept-Based Query Expansion and Re-ranking for Multimedia Retrieval", Proceedings of the 15th international conference on Multimedia, Sep. 23-28, 2007, 10 pages.

Ruofan Wang et al., "Re-ranking Search Results Using Semantic Similarity", Eighth International Conference on Fuzzy Systems and Knowledge Discovery, vol. 2, Jul. 26-28, 2011, 5 pages.

\* cited by examiner

Search Query Expansion

Search Results with their Distribution

| Initial Query | Search Results | Percentage Covered (Total Number of Elements Searched = 41) |
|---|---|---|
| design and management of 'web sit' [No. of Sections Matched=14] | [Sec14, Sec10, Sec18, Sec9, Sec11, Sec28, Sec33, Sec12, Sec37, Sec5, Sec24, Sec31, Sec20, Sec40] | 34.1% |
| brownfelds [No. of Sections Matched=3] | [Sec21, Sec16, Sec25] | 7.3% |
| Proprty [No. of Sections Matched = 20] | [Sec27, Sec13, Sec17, Sec30, Sec26, Sec34, Sec6, Sec7, Sec35, Sec32, Sec29, Sec38, Sec36, Sec23, Sec2, Sec39, Sec3, Sec19, Sec22, Sec41] | 48.8% |
| report generation Module [No. of Sections Matched = 4] | [Sec1, Sec4, Sec8, Sec15] | 9.8% |

945 — Back  950  955 — Show Result Clusters  960  Exit

FIG. 9E

Search Query Expansion

Query Result Clusters

| Initial Query | Clustered Search Results |
|---|---|
| proprty | [Sec3,Sec22,Sec20], [Sec7,Sec30,Sec6,Sec17,Sec35,Sec25,Sec26,Sec27], [Sec23,Sec34,Sec13,Sec29], [Sec32,Sec19], [Sec21], [Sec39] |
| design and management of 'web sit' | [Sec31,Sec40,Sec36,Sec37], [Sec10,Sec18,Sec33,Sec14], [Sec28,Sec12], [Sec24] |
| brownfelds | [Sec5,Sec9,Sec11], [Sec2], [Sec16], [Sec38] |
| report generation module | [Sec1,Sec8], [Sec4,Sec15] |

965

Back    Exit

FIG. 9F

USER-GUIDED SEARCH QUERY EXPANSION

RELATED APPLICATION

This application is claims priority to Indian Patent Application No. 1007/CHE/2014, filed on Feb. 27, 2014, the content of which is incorporated by reference herein in its entirety.

BACKGROUND

Search query expansion may be used to reformulate an initial search query to include related search queries, and using the initial search query and the related search queries when performing a search. Search query expansion may improve the relevance of search results.

SUMMARY

According to some possible implementations, a device may receive information that identifies a search query to be used to search a text. The search query may include a first multi-word term. The device may determine, based on user input, one or more search query expansion techniques to be performed to expand the search query. The device may perform the one or more search query expansion techniques to generate a set of expanded search queries based on the search query and the text. The set of expanded search queries may include a second multi-word term. The device may search the text, using the set of expanded search queries, to identify a plurality of sections of the text that include an expanded search query included in the set of expanded search queries. The device may provide search results that identify the plurality of sections of the text based on searching the text.

According to some possible implementations, a computer-readable medium may store one or more instructions that, when executed by one or more processors, cause the one or more processors to: receive information that identifies a search query to be used to search a text; provide information that identifies a plurality of search query expansion techniques for expanding the search query; receive a selection of one or more search query expansion techniques, of the plurality of search query expansion techniques, to be performed to expand the search query; perform the one or more search query expansion techniques to generate a set of expanded search queries based on the search query and the text; search the text, using the set of expanded search queries, to identify a plurality of sections of the text that include an expanded search query included in the set of expanded search queries; and provide search results that identify the plurality of sections of the text based on searching the text.

According to some possible implementations, a method may include receiving, by a device, information that identifies a search query to be used to search a text. The method may include determining, by the device, one or more search query expansion techniques to be performed to expand the search query. The method may include performing, by the device, the one or more search query expansion techniques using the search query and the text. The method may include determining, by the device, a plurality of expanded search queries based on performing the one or more search query expansion techniques, where one or more of the plurality of expanded search queries are included in the text. The method may include providing, by the device, information that identifies a set of expanded search queries included in the plurality of expanded search queries. The method may include receiving, by the device, input that modifies the set of expanded search queries. The method may include generating, by the device, a modified set of expanded search queries based on the input that modifies the set of expanded search queries. The method may include searching the text, by the device and using the modified set of expanded search queries, to identify a plurality of sections of the text that include an expanded search query included in the modified set of expanded search queries. The method may include providing, by the device, search results that identify the plurality of sections of the text based on searching the text.

BRIEF DESCRIPTION OF THE DRAWINGS

FIGS. 9A-9F are diagrams of an example implementation relating to the example process shown in FIG. 8.

DETAILED DESCRIPTION

The following detailed description of example implementations refers to the accompanying drawings. The same reference numbers in different drawings may identify the same or similar elements.

A text document may include terms that are related to one another, but not identical. A user may use a search query to search the text document for a particular term. Search results generated using the search query may be limited to results that include the particular term (e.g., an exact match), and may not include results that include related terms (e.g., non-exact matches). Thus, search results generated in this manner may be incomplete, in that the search results may omit results that are relevant but that do not include an exact match of the search query.

Implementations described herein permit a user to select one or more techniques to expand an initial search query to include a set of related search queries. To perform the techniques, a client device may search a text document, using the initial search query, to identify terms that are related to the initial search query (e.g., terms that may be misspellings of the search query, terms that may be proper spellings of the search query, terms that may be semantically related to the search query, terms that may be aliases of the search query, terms that are contained within the search query, etc.). The related terms may be included in the set of related search queries, which may be used to search the text document to generate search results. The search results may identify sections of the text document that include a search query included in the set of related search queries. In this way, the user may discover a section of the text document that is relevant to a search query, even though the section may not include a term that is an exact match of the search query.

Figure 1A:
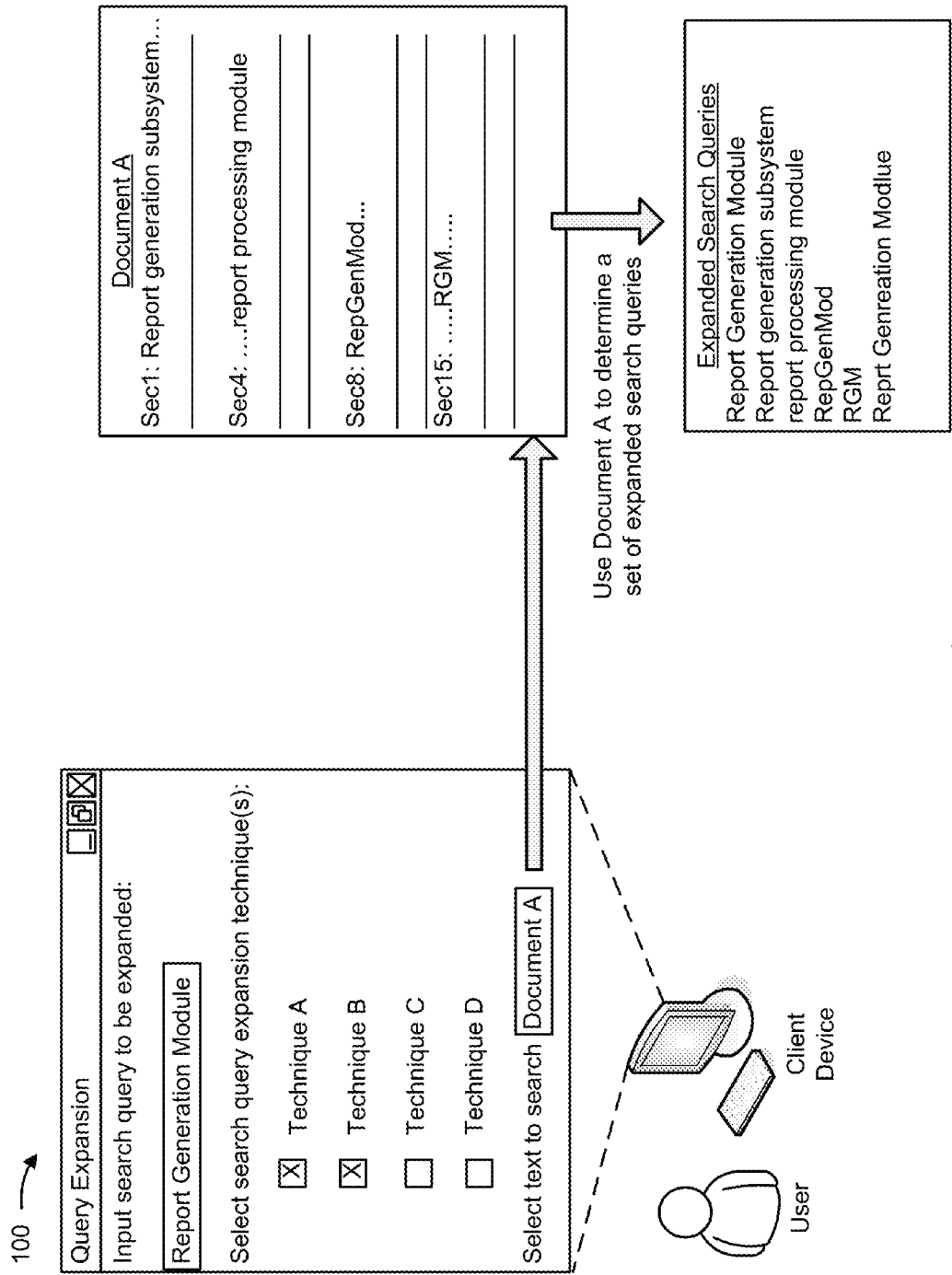
FIGS. 1A and 1B are diagrams of an overview of an example implementation described herein.
Figure 1B:
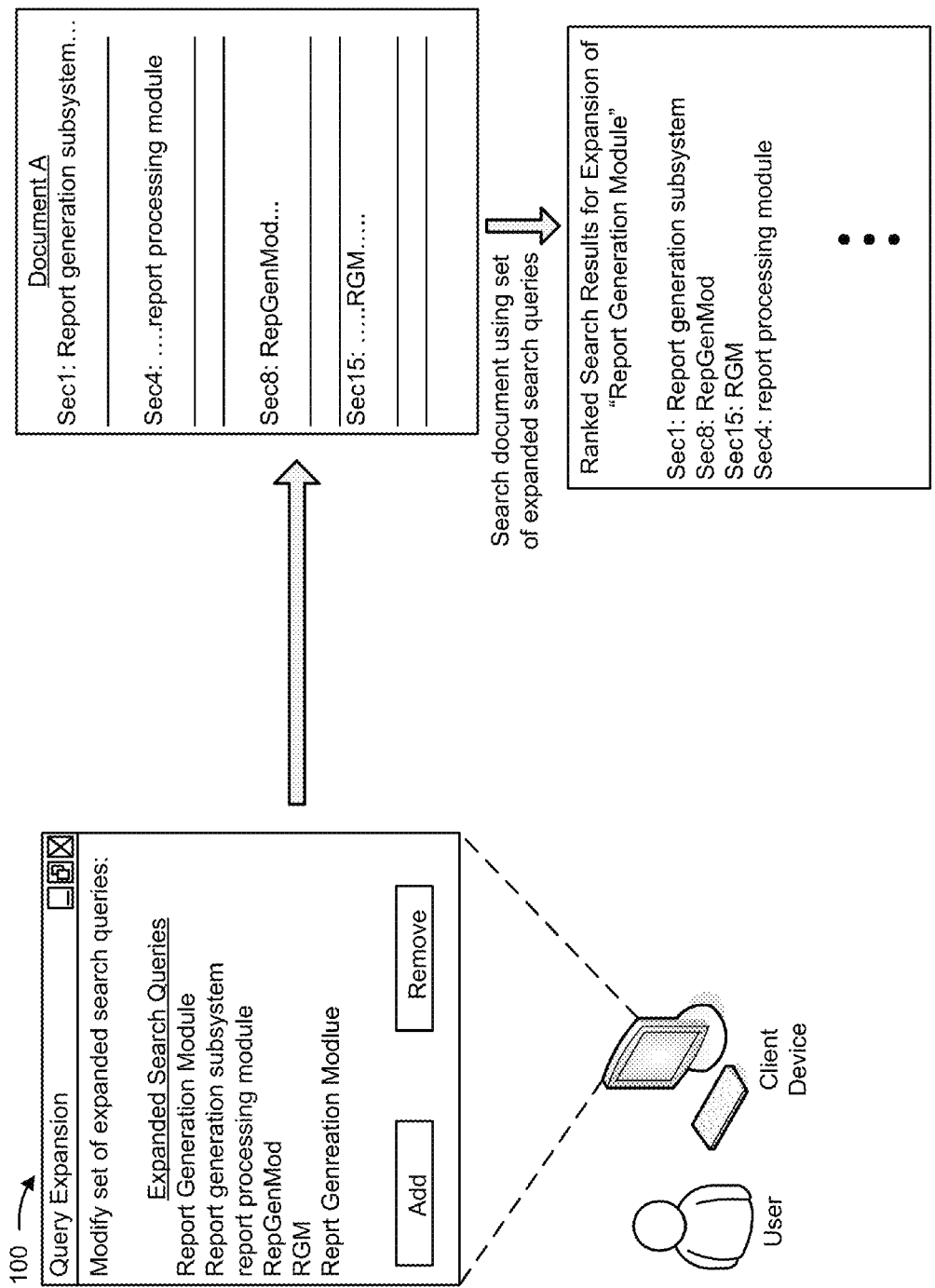

FIGS. 1A and 1B are diagrams of an overview of an example implementation 100 described herein. As shown in FIG. 1A, a user may interact with a client device to input, via a user interface, a search query to be expanded. As shown, assume that the user inputs a search query of "Report Generation Module." As further shown, the user may select one or more search query expansion techniques to be applied to expand the search query, and may input information that identifies a text to be used to expand the search query. As shown, assume that the user selects two search query expansion techniques, and selects a document shown as "Document A."

As further shown in FIG. 1A, assume that the client device loads Document A, which includes various terms that are similar to the search query "Report Generation Module," such as "Report generation subsystem, "report processing module," "RepGenMod," and "RGM." As shown, the client device may use Document A to determine a set of expanded search queries. Client device may use the one or more search query expansion techniques to identify terms included in Document A that are related to the search query of "Report Generation Module." For example, the related terms may be misspellings of the search query, may be proper spellings of a misspelled search query, may be semantically related to the search query, may be aliases of the search query, may be contained within the search query, may contain the search query, etc.

As shown in FIG. 1B, the client device may permit the user to modify the set of expanded search queries, such as by adding terms to the set, removing terms from the set, or modifying terms in the set. As further shown, the client device may search Document A (and/or another text or set of texts) to identify sections of the text that include a search query in the set of expanded search queries. The client device may provide search results, and may identify sections of the text in which the search queries were found. In some implementations, the client device may cluster related search results. In this way, the client device may provide search results that are related to the user's initial search query, which may increase the usefulness of the search.

Figure 2:
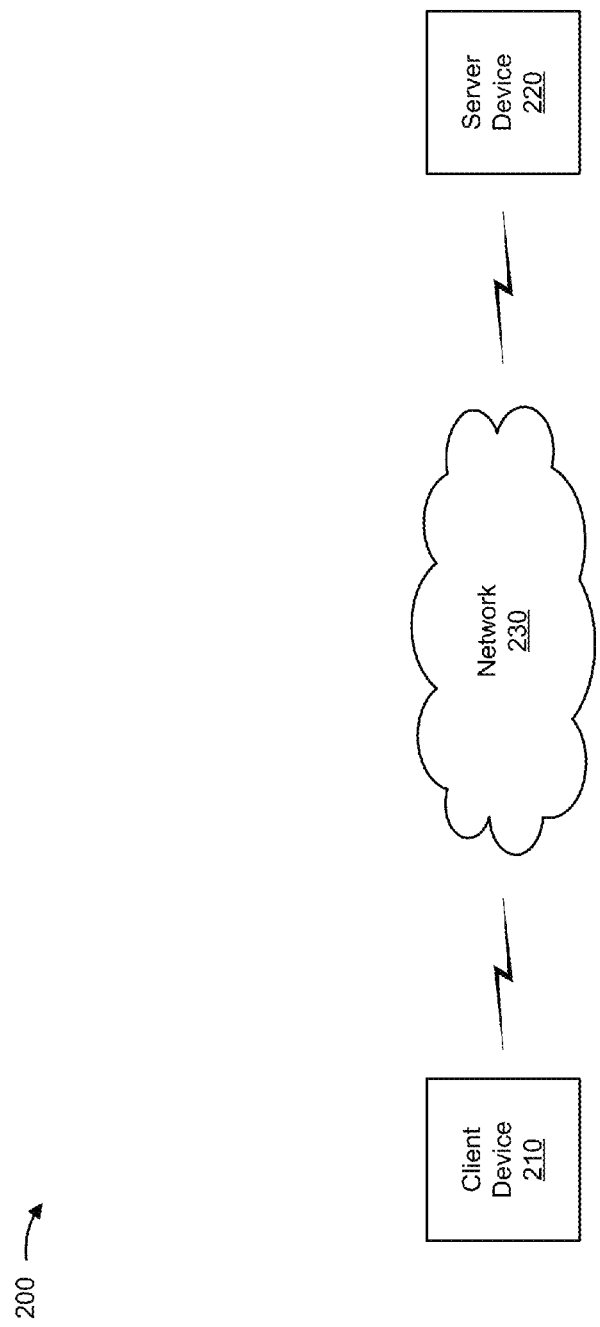
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing text and/or information associated with text (e.g., a search query, a set of expanded search queries, etc.). For example, client device 210 may include a computing device, such as a desktop computer, a laptop computer, a tablet computer, a server, a mobile phone (e.g., a smart phone, a radiotelephone, etc.), or a similar device. In some implementations, client device 210 may receive a search query, and may process text to expand the search query. Additionally, or alternatively, client device 210 may search text using a search query and/or a set of expanded search queries. In some implementations, client device 210 may receive information from and/or transmit information to server device 220 (e.g., text and/or information associated with text).

Server device 220 may include one or more devices capable of receiving, generating, storing, processing, and/or providing text and/or information associated with text. For example, server device 220 may include a computing device, such as a server, a desktop computer, a laptop computer, a tablet computer, or a similar device.

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
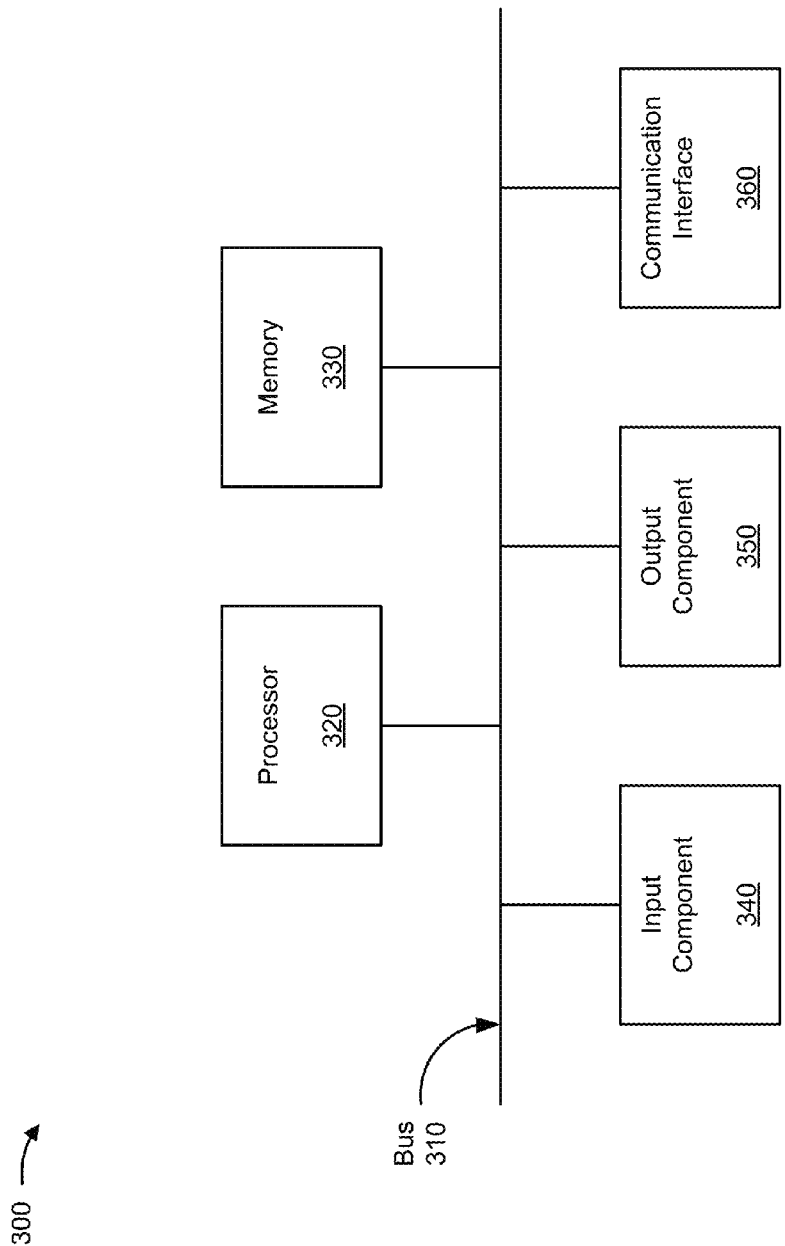
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
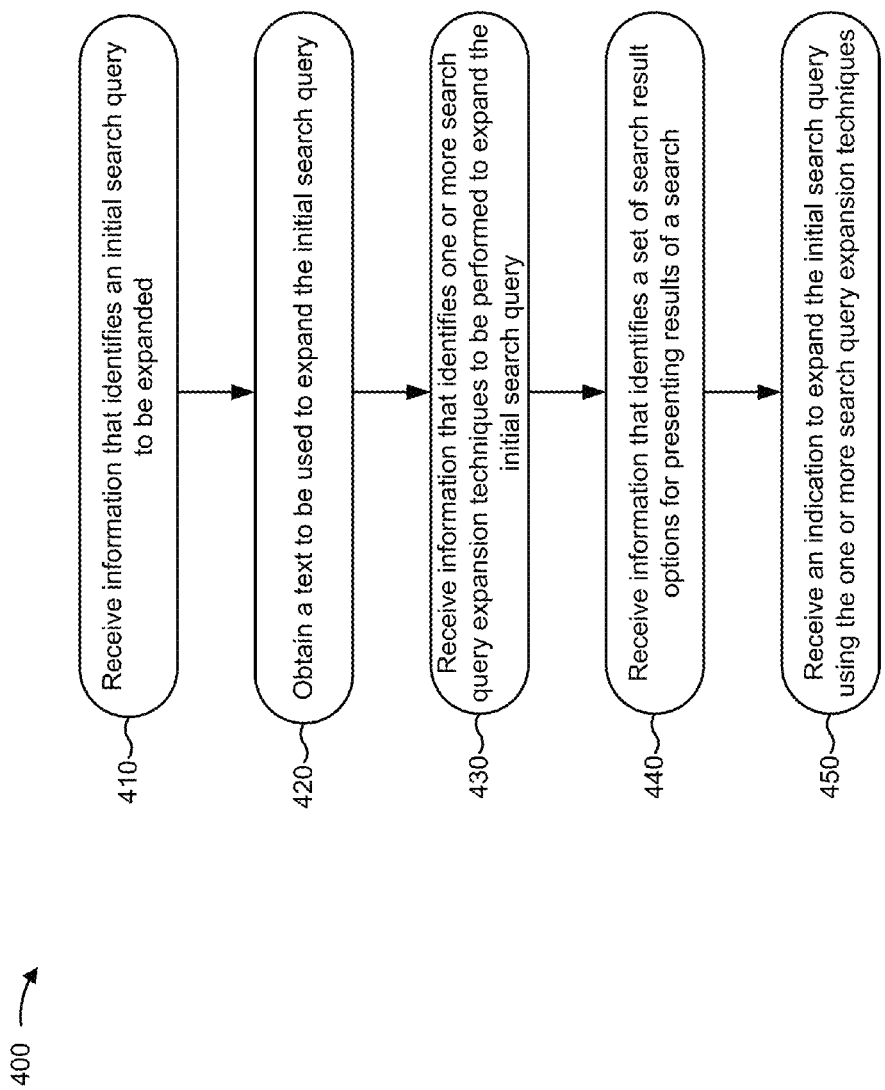
FIG. 4 is a flow chart of an example process for configuring a manner in which an initial search query is to be expanded.

FIG. 4 is a flow chart of an example process 400 for configuring a manner in which an initial search query is to be expanded. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information that identifies an initial search query to be expanded (block 410). For example, client device 210 may receive (e.g., via input from a user and/or another device) information that identifies an initial search query to be expanded. In some implementations, a user may interact with a user interface, provided by client device 210, to input the information. For example, client device 210 may provide a text box via the user interface, and the user may use an input device (e.g., a keyboard, a touch screen, etc.) to input an initial search query into the text box. Client device 210 may receive an indication that the initial search query (e.g., input by a user) is to be expanded, and may expand the initial search query to include a set of expanded search queries that include search queries related to the initial search query, as described in more detail elsewhere herein. In some implementations, client device 210 may receive information that identifies multiple search queries to be expanded and used to search a text.

A search query may include a term. A term, as used herein, may refer to a set of characters, such as a single character, multiple characters (e.g., a character string), a combination of characters (e.g., in a particular order) that form a word, a combination of characters that form multiple words (e.g., a phrase, a sentence, a paragraph, etc.), a combination of characters that form an acronym, a combination of characters that form an abbreviation of a word, a combination of characters that form a misspelled word, etc. In some implementations, a user may denote a multi-word term included in a search query by using a delimiter, such as single quotes (e.g., 'multi-word term'), double quotes (e.g., "multi-word term"), or the like. Additionally, or alternatively, client device 210 may determine separate words or strings included in a search query based on a delimiter, such as a space, a comma, a semicolon, a single quote, a double quote, the word "and," the word "or," etc.

As further shown in FIG. 4, process 400 may include obtaining a text to be used to expand the initial search query (block 420). For example, client device 210 may obtain a text. The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or any information that includes text. In some implementations, client device 210 may receive an indication of one or more sections of text to be used to expand the initial search query.

In some implementations, a user may input information identifying the text or a memory location at which the text is stored (e.g., local to and/or remote from client device 210). Based on the user input, client device 210 may retrieve the text. Additionally, or alternatively, client device 210 may provide a user interface via which a user may input text, and client device 210 may obtain the text based on the information input via the user interface.

Client device 210 may use the text to expand an initial search query, as described in more detail elsewhere herein. For example, client device 210 may apply one or more search query expansion techniques that use the initial search query and the text to expand the initial search query.

As further shown in FIG. 4, process 400 may include receiving information that identifies one or more search query expansion techniques to be performed to expand the initial search query (block 430). For example, client device 210 may receive (e.g., via input from a user and/or another device) information that identifies one or more search query expansion techniques to be performed to expand the initial search query. A search query expansion technique may refer to an algorithm that generates a set of expanded search queries based on an initial search query (e.g., a search query input by a user). Client device 210 may apply a search query expansion technique to an initial search query and a text to generate a set of expanded search queries.

A search query expansion technique may include, for example, a misspelling analysis that determines whether a first term (e.g., a term included in the text) and a second term (e.g., a term included in the search query) are potential misspellings of one another, a semantic relatedness analysis that identifies a measure of semantic relatedness between the first term and the second term, an alias analysis that determines whether the first term and the second term are alias terms, a containment analysis that determines whether a set of characters included in the first term is also included in the second term, etc. Client device 210 may receive information that identifies one or more of these or other search query expansion techniques to be performed to expand an initial search query.

For example, client device 210 may provide, via a user interface, information that identifies a set of search query expansion techniques. Client device 210 may receive user input that specifies one or more (e.g., a subset, the entire set, etc.) of the search query expansion techniques to be performed to expand the initial search query. Client device 210 may apply the specified search query expansion technique(s) to the initial search query and a specified text to generate a set of expanded search queries, as described in more detail elsewhere herein.

Additionally, or alternatively, client device 210 may receive information that identifies weights to be assigned to different search query expansion techniques. Client device 210 may assign the identified weights to the search query expansion techniques when expanding the search query and/or scoring search results, as described in more detail elsewhere herein. Client device 210 may assign a same weight value or different weight values to different search query expansion techniques. Additionally, or alternatively, client device 210 may calculate a score using a set of search query expansion techniques and/or weight values, and may use the score to expand an initial search query and/or score a search result. In some implementations, the weight value may weight a search result relative to a perfect match (e.g., where every character of a search result matches every character of a search query). For example, a weight value of 0.5 for a semantic relatedness technique may give terms determined to be semantically related half as much weight as if the terms were perfect matches. In some implementations, a user may input a weight value as any real number in a range of numbers greater than or equal to zero.

As further shown in FIG. 4, process 400 may include receiving information that identifies a set of search result options for presenting results of a search (block 440). For example, client device 210 may receive (e.g., via input from a user and/or another device) information that identifies a set of search result options for presenting results of a search. Client device 210 may use the set of search result options when providing results of a search performed using a set of expanded search queries, as described in more detail elsewhere herein.

A search result option may include, for example, an indication of a quantity of search results to be provided for display (e.g., for each initial search query), an indication of whether search results are to be ranked (and/or how search results are to be ranked), an indication of whether relevance scores are to be provided for display in association with search queries (e.g., a relevance score that indicates a degree to which a search result is relevant to an initial search query), an indication of whether search results are to overlap across multiple queries (e.g., whether the same search result, or section of a text, is to be provided as a result for more than one initial search query), etc.

As further shown in FIG. 4, process 400 may include receiving an indication to expand the initial search query using the one or more search query expansion techniques (block 450). For example, client device 210 may receive (e.g., via input provided by a user and/or another device) an indication to expand the initial search query using the one or more search query expansion techniques. In some implementations, a user may specify the configuration parameters described above (e.g., an initial search query, a text, one or more search query expansion techniques, a set of search result options, etc.), and client device 210 may use the configuration parameters to expand the initial search query, as described in more detail elsewhere herein. In this way, a user may customize a manner in which an initial search query is expanded by client device 210.

Although FIG. 4 shows example blocks of process 400, in some implementations, process 400 may include additional blocks, fewer blocks, different blocks, or differently arranged blocks than those shown in FIG. 4. Additionally, or alternatively, two or more of the blocks of process 400 may be performed in parallel.

Figure 5A:
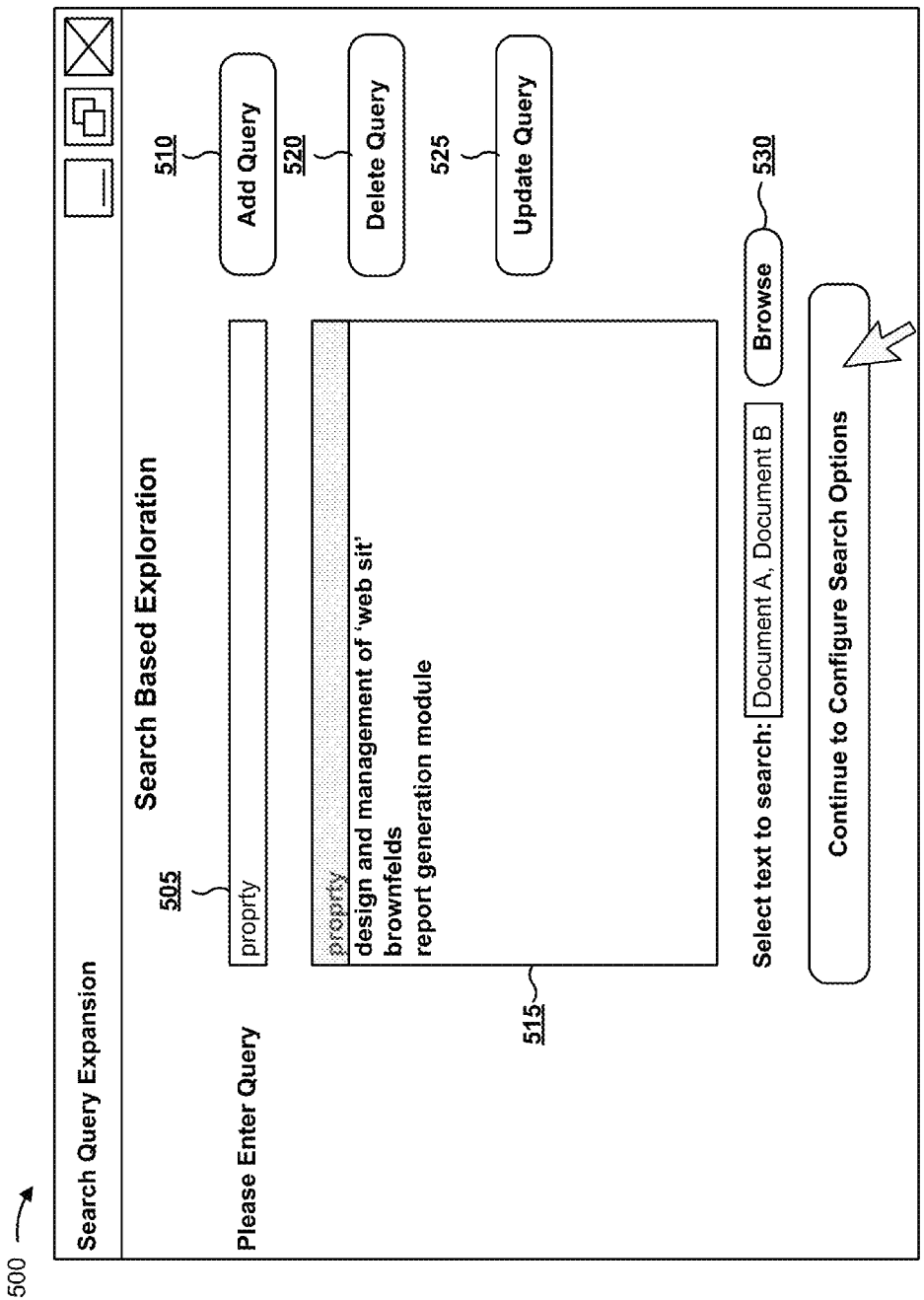
FIGS. 5A and 5B are diagrams of an example implementation relating to the example process shown in FIG. 4.
Figure 5B:
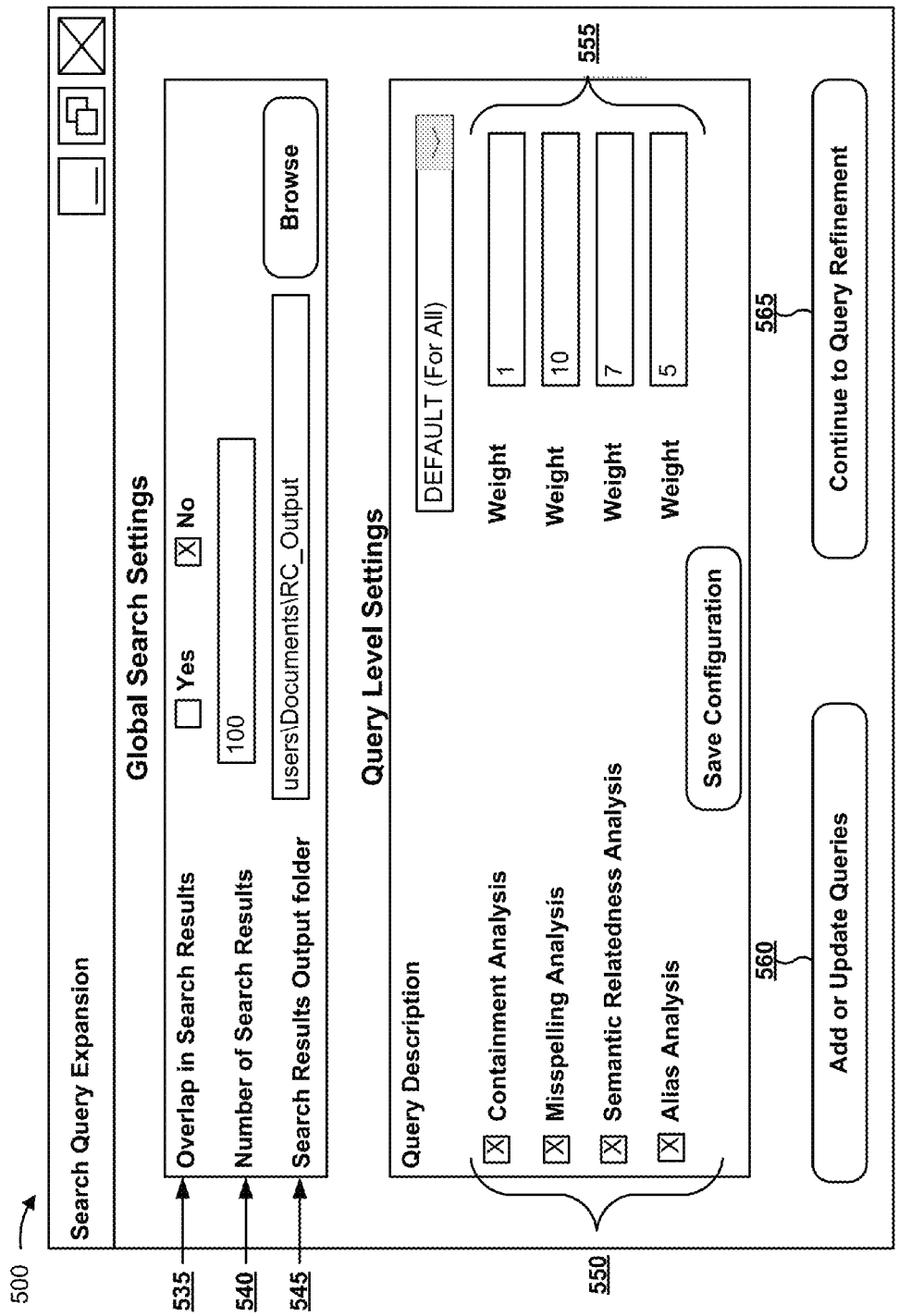

FIGS. 5A and 5B are diagrams of an example implementation 500 relating to example process 400 shown in FIG. 4.

FIGS. 5A and 5B show an example of configuring a manner in which an initial search query is to be expanded.

As shown in FIG. 5A, assume that client device 210 provides a user interface via which a user is permitted to input configuration parameters that control a manner in which an initial search query is to be expanded and/or a manner in which search results are to be provided for display. As shown by reference number 505, assume that the user inputs a search query, shown as "proprty" (e.g., a misspelling of "property"). As shown by reference number 510, the user may interact with an add query input mechanism to add the input search query "proprty" to a set of initial search queries to be expanded. As shown by reference number 515, client device 210 may provide a list of initial search queries that are to be expanded and used to search a text. As shown, assume that the list includes the search queries "proprty," "design and management of 'web sit'" (e.g., a misspelling of "web site"), and "brownfelds" (e.g. a misspelling of "brownfields").

As shown by reference number 520, the user may interact with a delete query input mechanism to remove a search query from the set of initial search queries to be expanded. As shown by reference number 525, the user may interact with an update query input mechanism to modify an initial search query included in the set of initial search queries to be expanded. For example, the user may select "design and management of 'web sit'," may select the update query input mechanism, and may correct the misspelled search query to "design and management of 'web site.'"

As shown by reference number 530, the user may select a text to be used to expand the initial search queries. As shown, assume that the user identifies two documents, shown as "Document A" and "Document B," to be used to expand the set of initial search queries. As further shown, assume that the user interacts with an input mechanism to continue to configure search options.

As shown in FIG. 5B, assume that user interaction with the input mechanism causes client device 210 to provide another user interface that permits the user to input additional configuration parameters. As shown by reference number 535, assume that the user inputs an option to prevent a particular search result from being provided as a result for more than one search query. As shown by reference number 540, assume that the user specifies that a maximum number of one hundred search results are to be provided for display. As shown by reference number 545, assume that the user identifies a location where the search results are to be output (e.g., a file in which the search results are to be stored).

As shown by reference number 550, assume that the user specifies that client device 210 is to perform a containment analysis, a misspelling analysis, a semantic relatedness analysis, and an alias analysis to expand the initial search queries. As shown by reference number 555, assume that the user inputs different weight values to be applied to the different query expansion techniques to expand the initial search queries and/or score search results. In some implementations, the user may select to apply default weight values to the search query expansion techniques, and client device 210 may determine default weight values to be applied to the search query expansion techniques (e.g., based on information stored in a data structure).

As shown by reference number 560, the user may interact with an add or update queries input mechanism to return to the user interface shown in FIG. 5A and modify the set of initial search queries. As shown by reference number 565, the user may indicate that the user has finished inputting configuration parameters, which may cause client device 210 to perform the selected query expansion techniques to expand the initial search queries, as described in more detail elsewhere herein.

As indicated above, FIGS. 5A and 5B are provided merely as an example. Other examples are possible and may differ from what was described with regard to FIGS. 5A and 5B.

Figure 6:
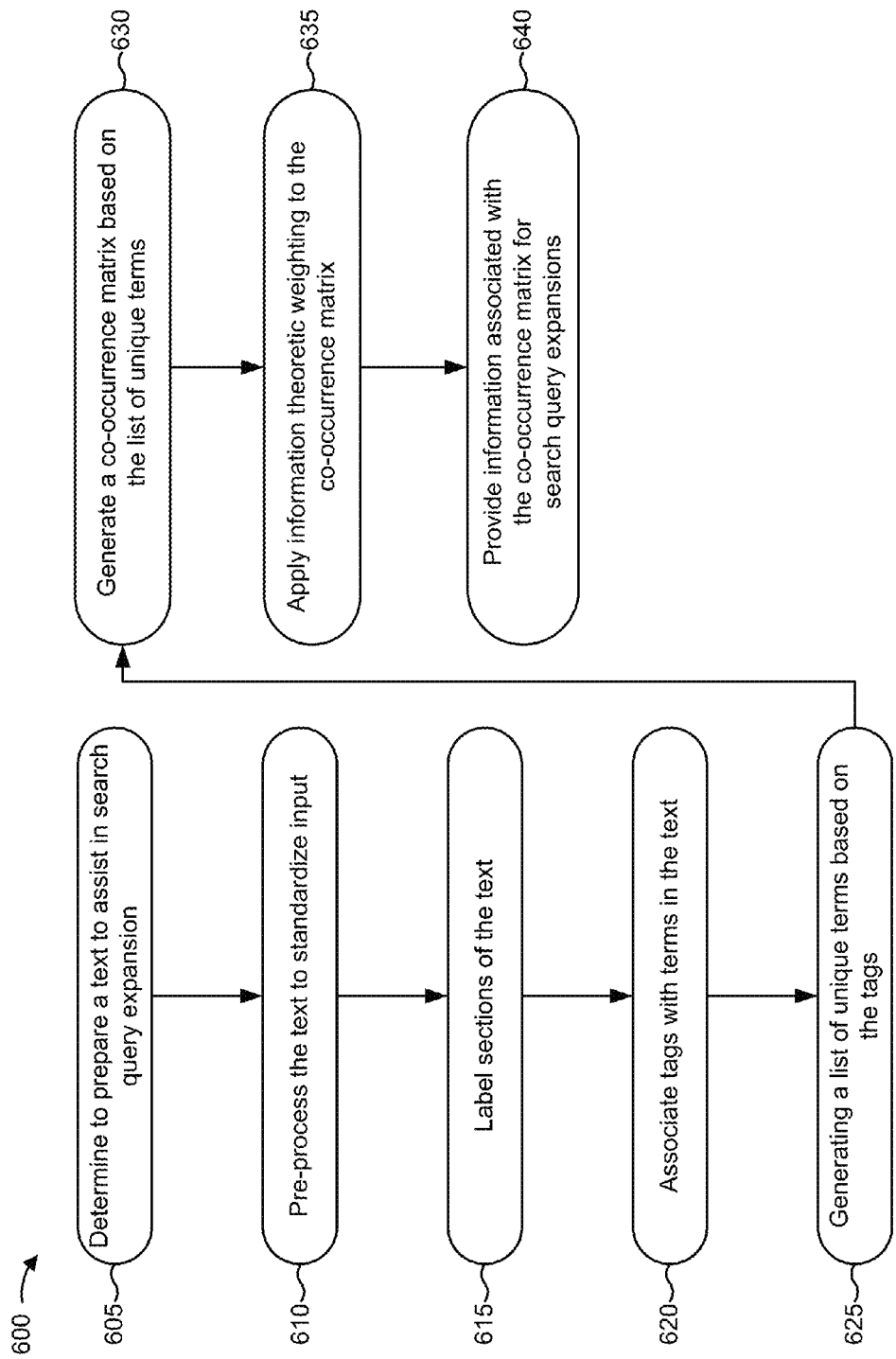
FIG. 6 is a flow chart of an example process for preparing a text to assist in search query expansion.

FIG. 6 is a flow chart of an example process 600 for preparing a text to assist in search query expansion. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include determining to prepare a text to assist in search query expansion (block 605). For example, client device 210 may determine to prepare a text to assist in search query expansion based on receiving a request (e.g., from a user and/or another device). In some implementations, client device 210 may determine to prepare the text based on a user interaction with a user interface. In some implementations, determining to prepare the text may include obtaining the text. For example, client device 210 may obtain the text from memory and/or from another device, such as a storage device, server device 220 (e.g., via a network), or the like.

Determining to prepare the text may include determining text sections to be processed, in some implementations. For example, client device 210 may partition the text into sections, and may process particular sections of the text. In some implementations, client device 210 may determine sections of the text to process based on a user interaction, based on an indication from server device 220, or the like.

As further shown in FIG. 6, process 600 may include pre-processing the text to standardize input (block 610). For example, client device 210 may process sections of the text to standardize the text for processing. In some implementations, pre-processing the text may include adjusting characters, such as by removing characters, replacing characters, adding characters, adjusting a font, adjusting formatting, adjusting spacing, or the like. For example, client device 210 may replace multiple spaces with a single space, may insert a space after a left parenthesis, a left brace, a left bracket, etc., may insert a space before a right parenthesis, a right brace, a right bracket, etc. In this way, client device 210 may use the space delimiter to more easily parse the text.

As further shown in FIG. 6, process 600 may include labeling sections of the text (block 615). For example, client device 210 may determine sections of the text to be labeled, and may label one or more sections of the text. For example, client device 210 may receive input indicating a manner in which the text is to be partitioned into sections, and client device 210 may partition the text into sections based on the indication. A text section may include, for example, a sentence, a line, a paragraph, a page, a document, etc. In some implementations, client device 210 may label each text section, and may use the labels when processing the text to expand a search query and/or to search the text using a search query. Additionally, or alternatively, client device 210 may process each text section separately (e.g., serially or in parallel). In some implementations, a text section may correspond to a search result.

In some implementations, client device 210 may determine one or more unique identifiers to be associated with sections of the text. In some implementations, client device 210 may generate a data structure storing section identifiers. For example, client device 210 may generate a list of section identifiers D of size d (e.g., with d elements), where d is equal to the number of unique sections in the text (e.g., where unique requirements list D=[$Sec_1$, $Sec_2$, . . . , $Sec_d$]). In some implementations, client device 210 may label sections of the text based on processing the text. For example, client device 210 may process the text to identify the sections (e.g., based on a delimiter). Additionally, or alternatively, client device 210 may receive an indication of the sections, such as a set of section tags, a user identification of the sections, or the like.

As further shown in FIG. 6, process 600 may include associating tags with terms in the text (block 620). For example, client device 210 may receive information that identifies one or more tags, and may associate the tags with terms in the text based on tag association rules. The tag association rules may specify a manner in which the tags are to be associated with the terms based on characteristics of the terms. For example, a tag association rule may specify that a singular noun tag ("/NN") is to be associated with terms (e.g., words) that are singular nouns (e.g., based on a language database, a context analysis, etc.). Client device 210 may determine terms and/or words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging words in the text with the POS tags based on the part-of-speech of the word. Example part-of-speech tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VGZ (verb, third person singular present tense), VBN (verb, past participle), RB (adverb), RBR (adverb, comparative), RBS (adverb, superlative), JJ (adjective), JJR (adjective, comparative), JJS (adjective, superlative), etc.

As an example, client device 210 may receive text that includes the following sentence:

The gasoline engine powers the car.

Client device 210 may tag the sentence with POS tags, as follows:

the/DT
gasoline/NN
engine/NN
powers/VB
the/DT
car/NN.

In the above tagged sentence, DT may represent a determiner tag (e.g., used to tag articles like a, an, and the), NN may represent a singular noun or mass noun tag (e.g., used to tag singular or mass nouns), and VB may represent a base-form verb tag (e.g., used to tag verbs in base form). These tags are provided as an example, and client device 210 may use additional or other tags in some implementations, as described elsewhere herein.

In some implementations, client device 210 may further process the tagged text to associate additional or alternative tags with groups of words that meet certain criteria. For example, client device 210 may associate an entity tag (e.g., ENTITY) with noun phrases (e.g., consecutive words with a noun tag, such as /NN, /NNS, /NNP, /NNPS, etc.). Client device 210 may apply entity tags and/or action tags to the tagged text, as follows:

the/DT
{gasoline engine}/ENTITY
powers/ACTION
the/DT
car/NN.

As can be seen, the nouns "gasoline" and "engine" have been combined into a single term "gasoline engine" (e.g., set off by braces { }), and have been tagged with an entity tag. In some implementations, client device 210 may only process terms with particular tags, such as noun tags, entity tags, verb tags, etc., when expanding a search query and/or performing a search.

As further shown in FIG. 6, process 600 may include generating a list of unique terms based on the tags (block 625). For example, client device 210 may generate a list of unique terms associated with one or more tags. The list of unique terms (e.g., a term corpus) may refer to a set of terms (e.g., single word terms, multi-word terms, etc.) extracted from the text. In some implementations, the term corpus may include terms tagged with a noun tag and/or a tag derived from a noun tag (e.g., an entity tag applied to words with successive noun tags). Additionally, or alternatively, the term corpus may include terms tagged with a verb tag and/or a tag derived from a verb tag (e.g., an action tag associated with a verb term). Additionally, or alternatively, the term corpus may include terms extracted from section headings of the text.

In some implementations, client device 210 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 210 may only add terms to the list that are not associated with a stop tag or identified as a stop term.

Additionally, or alternatively, client device 210 may convert terms to a root form when adding the terms to the list of unique terms. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

Generating a term corpus may include generating a data structure that stores terms extracted from the text, in some implementations. For example, client device 210 may generate a list of terms TermList of size t (e.g., with t elements), where t is equal to the number of unique terms in the text (e.g., where unique terms list TermList=[term$_1$, term$_2$, . . . , term$_t$]).

As further shown in FIG. 6, process 600 may include generating a co-occurrence matrix based on the list of unique terms (block 630). For example, client device 210 may generate a term occurrence matrix C of size t×d (e.g., with t rows and d columns), where t is equal to the number of unique terms in the text (e.g., where unique terms list TermList=[term$_1$, term$_2$, . . . , term$_t$]), and where d is equal to the number of unique sections in the text (e.g., where unique requirements list D=[Sec$_1$, Sec$_2$, . . . , Sec$_d$]). The co-occurrence matrix C may store an indication of a quantity of times that each term appears in each section (e.g., in each sentence, where a section is a sentence). For example, a value stored at C[i, j] may represent a quantity of times that the i-th term (e.g., terms from the TermList) is included in the j-th section (e.g., Sec$_j$ from D). A single row in occurrence matrix C may be referred to as a term vector, and may represent a frequency of occurrence of a single term in each section. A single column in occurrence matrix C may be referred to as a section vector, and may represent the frequency of occurrence of each term, included in the list of unique terms TermList, in a single section.

As further shown in FIG. 6, process 600 may include applying information theoretic weighting to the co-occurrence matrix (block 635). For example, client device 210 may apply information theoretic weighting to adjust the values in matrix C. In some implementations, client device 210 may determine an inverse document frequency (idf) factor corresponding to a particular term (e.g., row) and section (e.g., column) based on the total number of sections d and the number of sections in which the term appears. For example, client device 210 may determine the idf factor for a particular term and section by dividing the total number of sections d by the number of sections in which the term appears, and by taking a logarithm of that quotient. In some implementations, client device 210 may apply information theoretic weighting to adjust the values of the co-occurrence matrix as follows:

$$C[i, j] = C[i, j] \times \ln\left(\frac{d}{n_i + 1}\right),$$

for each $i$ in $t$ and each $j$ in $d$.

where C[i,j] represents the co-occurrence matrix value (e.g., a frequency quantity) for a particular term in a particular section, d represents the total number of sections, and n$_i$ represents the number of sections that include term$_i$.

In some implementations, when client device 210 determines that a semantic relatedness analysis is to be performed, client device 210 may map the co-occurrence matrix to a lower-dimensional latent semantic space. The lower-dimensional latent semantic space may represent a semantic relatedness between terms and sections included in the text. For example, terms and sections with a high semantic relatedness may map to closer locations in the lower-dimensional latent semantic space than terms and section with a low semantic relatedness.

As an example, client device 210 may apply singular value decomposition (SVD) to co-occurrence matrix C, to determine matrices U, Σ, and V$^T$, such that:

$$C=U\Sigma V^T,$$

where C represents the co-occurrence matrix (e.g., with or without merged rows and/or with or without adjusted values), U represents a t×t unitary matrix, Σ represents a t×d rectangular diagonal matrix with nonnegative real numbers on the diagonal, and V$^T$ (the conjugate transpose of V) represents a d×d unitary matrix. The diagonal values of Σ (e.g., $\Sigma_{i,i}$) may be referred to as the singular values of matrix C.

Client device 210 may determine a truncation value k for reducing the size of matrix U, which may be useful for calculating a semantic relatedness score for two terms, as discussed in more detail elsewhere herein. Client device 210 may determine a quantity of non-zero singular values (e.g., the quantity of non-zero entries in Σ), which may be referred to as the rank r of matrix C, and may set the truncation value k equal to the rank r of matrix C. Alternatively, client device 210 may set the truncation value k equal to $(t \times d)^{0.2}$. In some implementations, client device 210 may set the truncation value k as follows:

If $(t \times d)^{0.2} < r$, then $k = (t \times d)^{0.2}$,

Otherwise, $k = r$.

Client device 210 may truncate the matrix U by removing columns from U that are not included in the first k columns (e.g., the truncated matrix U may only includes columns 1 through k of the original matrix U). The rows in truncated matrix U may correspond to term vectors in the latent semantic analysis (LSA) space.

As further shown in FIG. 6, process 600 may include providing information associated with the co-occurrence matrix for search query expansion (block 640). For example, client device 210 may provide information associated with the co-occurrence matrix, such as the term list, the section list, the co-occurrence matrix, the truncated co-occurrence matrix, or the like. In some implementations, client device 210 may provide the information via a user interface and/or to another device. In this way, client device 210 may obtain a text to assist in search query expansion, and may process the text to prepare the text to be used for search query expansion and/or to prepare the text to be searched.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of preparing a text to assist in search query expansion. For the purpose of FIGS. 7A-7E, assume that a user and client device 210 have performed the operations described herein in connection with FIGS. 5A and 5B.

Figure 7A:
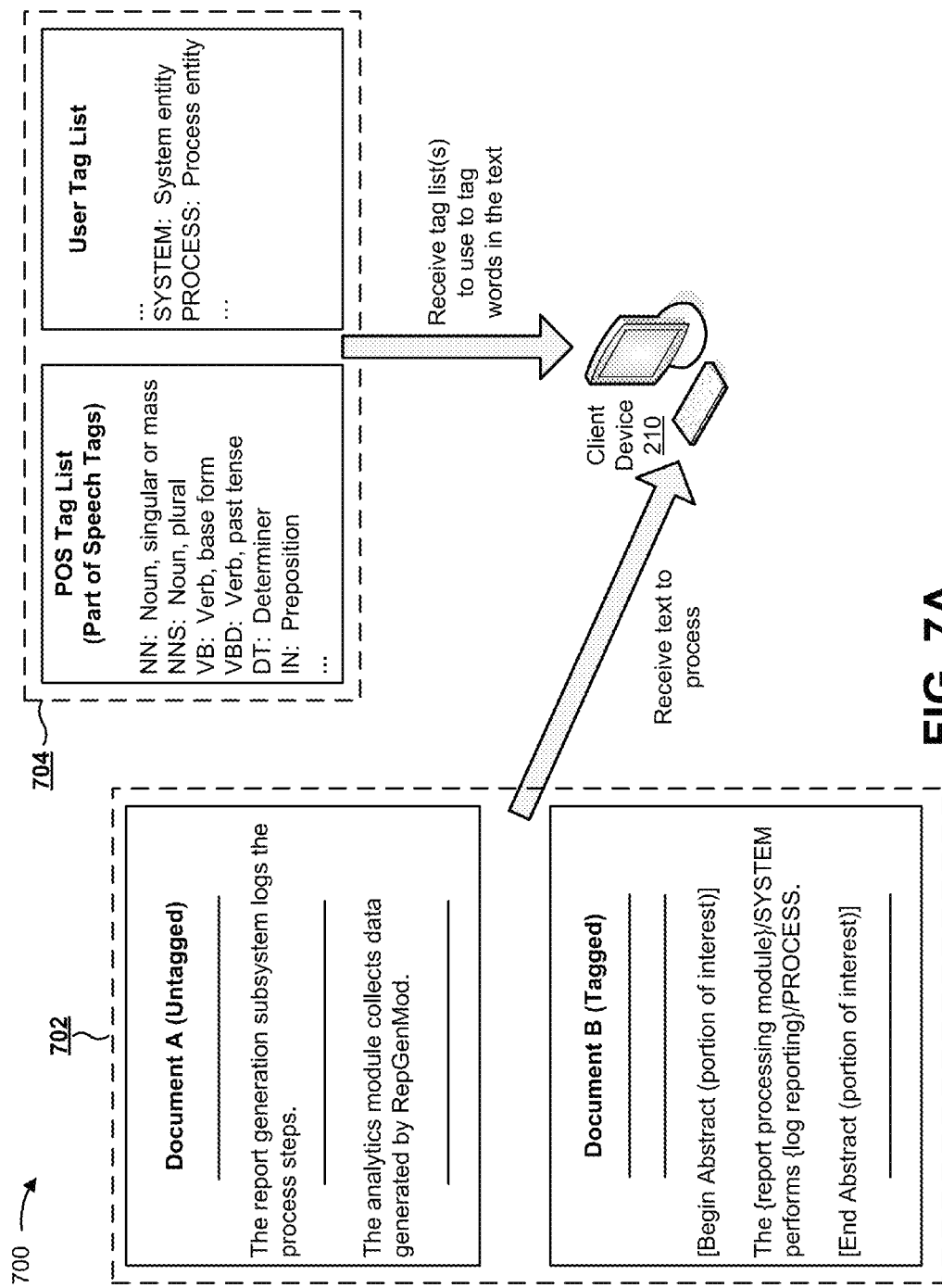
FIGS. 7A-7E are diagrams of an example implementation relating to the example process shown in FIG. 6.

As shown in FIG. 7A, assume that client device 210 obtains a user-selected text 702, shown as Document A and Document B. As further shown, assume that client device 210 obtains a set of tag lists 704 (e.g., a POS Tag List and a User Tag List). As shown, Document A may include the following untagged text:

The report generation subsystem logs the process steps.

The analytics module collects data generated by RepGenMod.

As further shown, Document B may include the following text:

The report processing module performs log reporting.

The text in Document B may be tagged as follows:

The {report processing module}/SYSTEM performs {log reporting}/PROCESS.

Thus, the term "report processing module" may be tagged with a SYSTEM tag, and the term "log reporting" may be tagged with a PROCESS tag.

As further shown, the POS Tag List may include the following tags:

NN: Noun, singular or mass
NNS: Noun, plural
VB: Verb, base form
VBD: Verb, past tense
DT: Determiner
IN: Preposition.

The User Tag List may include the following tags:

SYSTEM: System entity
PROCESS: Process entity

The User Tag List may be associated with Document B (e.g., the SYSTEM and PROCESS tags). Client device 210 may receive text 702 and tag lists 704, and may process text 702 using tag lists 704.

Figure 7B:
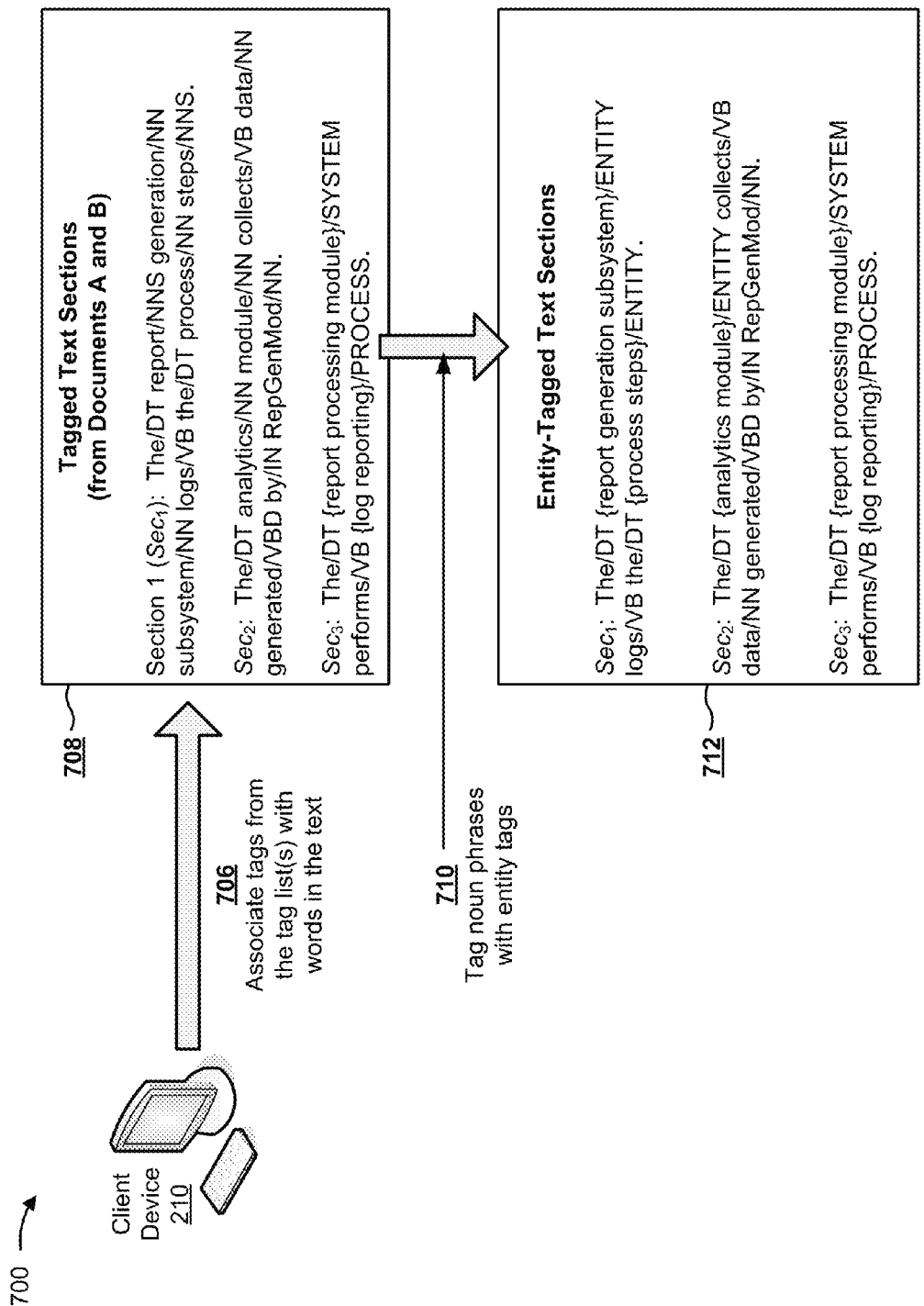

As shown in FIG. 7B, and by reference number 706, client device 210 may associate tags, from tag lists 704, with words in text 702 to generate tagged text sections 708. Prior to associating the tags with text 702, client device 210 may determine one or more text sections of text 702 to process. For example, client device 210 may determine that a first section of Document A, labeled $Sec_1$, corresponds to a first sentence of Document A: "The report generation subsystem logs the process steps." Similarly, client device 210 may determine that a second section of Document A, labeled $Sec_2$, corresponds to a second sentence of Document A: "The analytics module collects data generated by RepGenMod." Finally, client device 210 may determine that a section of Document B, labeled $Sec_3$, corresponds to a sentence of Document B: "The report processing module performs log reporting."

Client device 210 may process the text sections to associate the tags from tag lists 704 with words in the text sections. For example, client device 210 may tag section 1 as follows:

The/DT report/NNS generation/NN subsystem/NN logs/VB the/DT process/NN steps/NNS.

The above tagged text sections indicates the "the" is a determiner (DT); "report" and "steps" are plural nouns (NNS); "generation," "subsystem," and "process" are singular or mass nouns (NN); and "logs" is a verb base form (VB).

Client device 210 may tag section 2 and section 3 in a similar manner, as shown in tagged text sections 708. When associating tags with section 3, client device 210 may, in some implementations, tag untagged terms (e.g., "the" and "performs"). Additionally, or alternatively client device 210 may ignore terms that have already been tagged (e.g., "report processing module" and "log reporting"), or may add additional tags (e.g., POS tags) to terms that have already been tagged.

As shown by reference number 710, client device 210 may process tagged text sections 708 by tagging noun phrases with an entity tag to generate entity-tagged text sections 712. A noun phrase may include two or more consecutive words that have each been tagged with a noun tag (e.g., NN, NNS, etc.). For example, client device may tag the noun phrase "report/NNS generation/NN subsystem/NN" with an entity tag, and may optionally remove the noun tags, to generate the entity-tagged phrase "{report generation subsystem}/ENTITY." Similarly, client device 210 may tag the noun phrases "process steps," and "analytics module" with an entity tag, as shown.

Figure 7C:
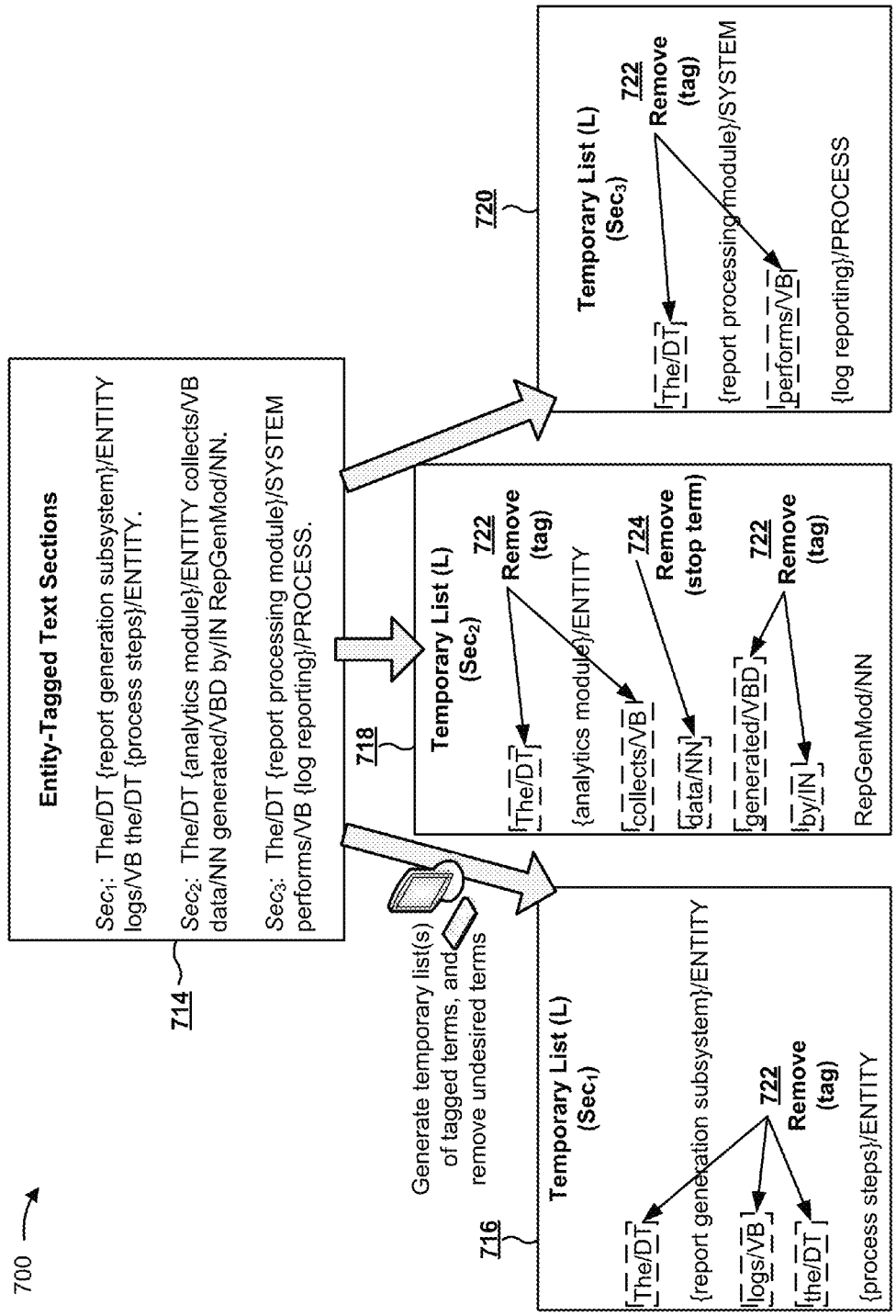

As shown in FIG. 7C, client device 210 may process entity-tagged text sections 714 to generate temporary lists (L) of tagged terms. In some implementations, client device 210 may process the text sections (e.g., $Sec_1$, $Sec_2$, and $Sec_3$) separately, and may generate a temporary list associated with each text section. For example, temporary list 716 may correspond to text section 1, temporary list 718 may correspond to text section 2, and temporary list 720 may correspond to text section 3.

As further shown in FIG. 7C, client device 210 may remove undesired terms from the temporary lists. Undesired terms may include terms associated with a particular tag and/or terms identified as stop terms. As shown by reference number 722, client device 210 may remove terms from the temporary lists based on a tag associated with the term. For example, client device 210 may remove terms, from temporary lists 716-720, associated with the DT, VB, VBD, or IN tags. As shown by reference number 724, client device 210 may remove terms from the temporary lists based on identifying the term as a stop term (e.g., based on a received list of stop terms, such as a stop term list input by a user). For example, client device 210 may remove the term "data" from temporary list 718.

Figure 7D:
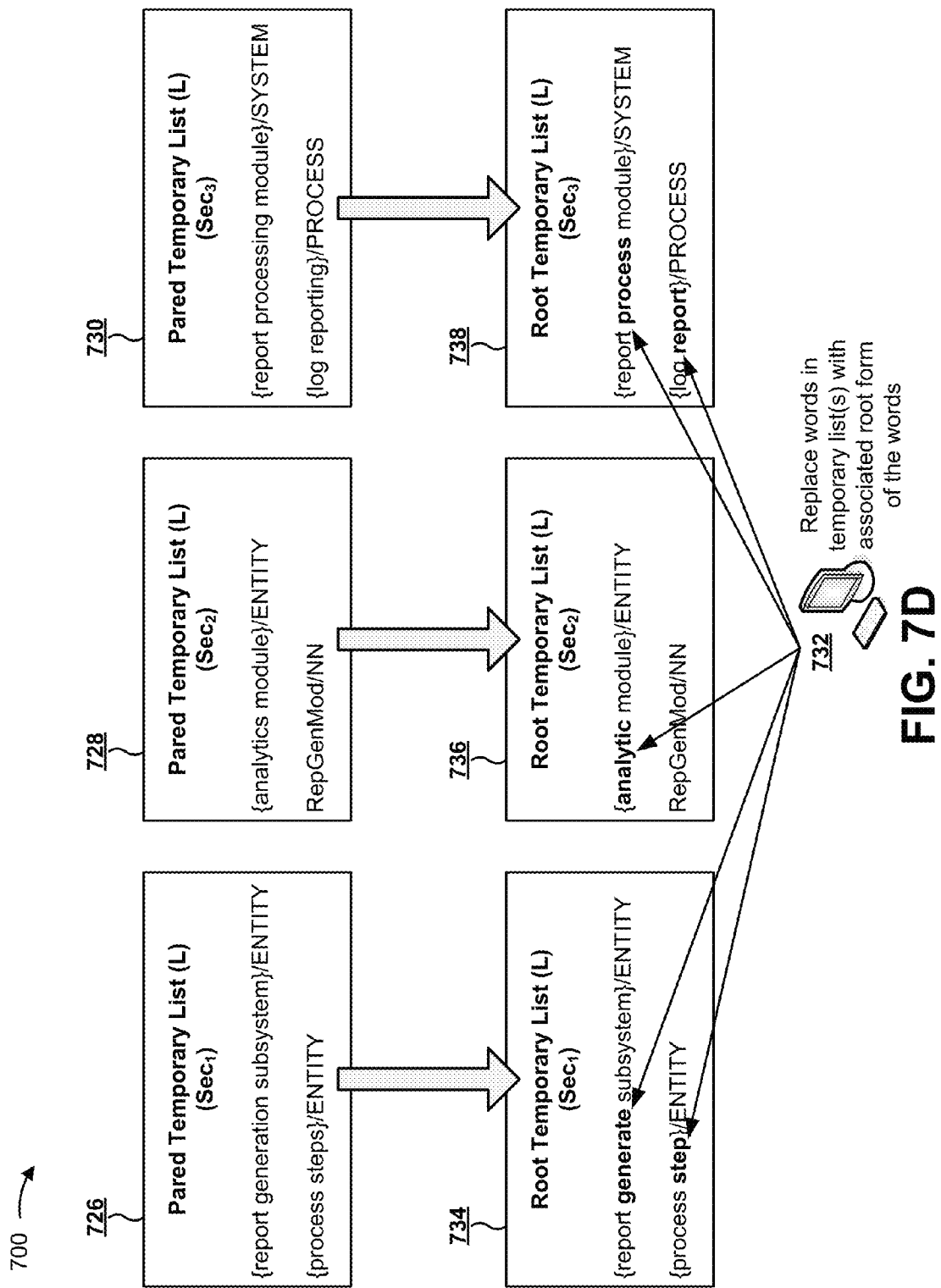

As shown in FIG. 7D, once the undesired terms have been removed from temporary lists 716-720, the temporary lists may be referred to as pared temporary lists 726-730. As shown by reference number 732, client device 210 may process pared temporary lists 726-730, by replacing words in pared temporary lists 726-730 with root forms of the words, to generate root temporary lists 734-738. For example, client device 210 may replace the words "generation" and "steps," in pared temporary list 726, with the words "generate" and "step," respectively, to generate root temporary list 734. Similarly, client device 210 may replace the word "analytics," in pared temporary list 728, with the word "analytic," to root stemmed temporary list 736. Finally, client device 210 may replace the words "processing" and "reporting," in pared temporary list 730, with the words "process" and "report," respectively, to generate root temporary list 738.

Figure 7E:
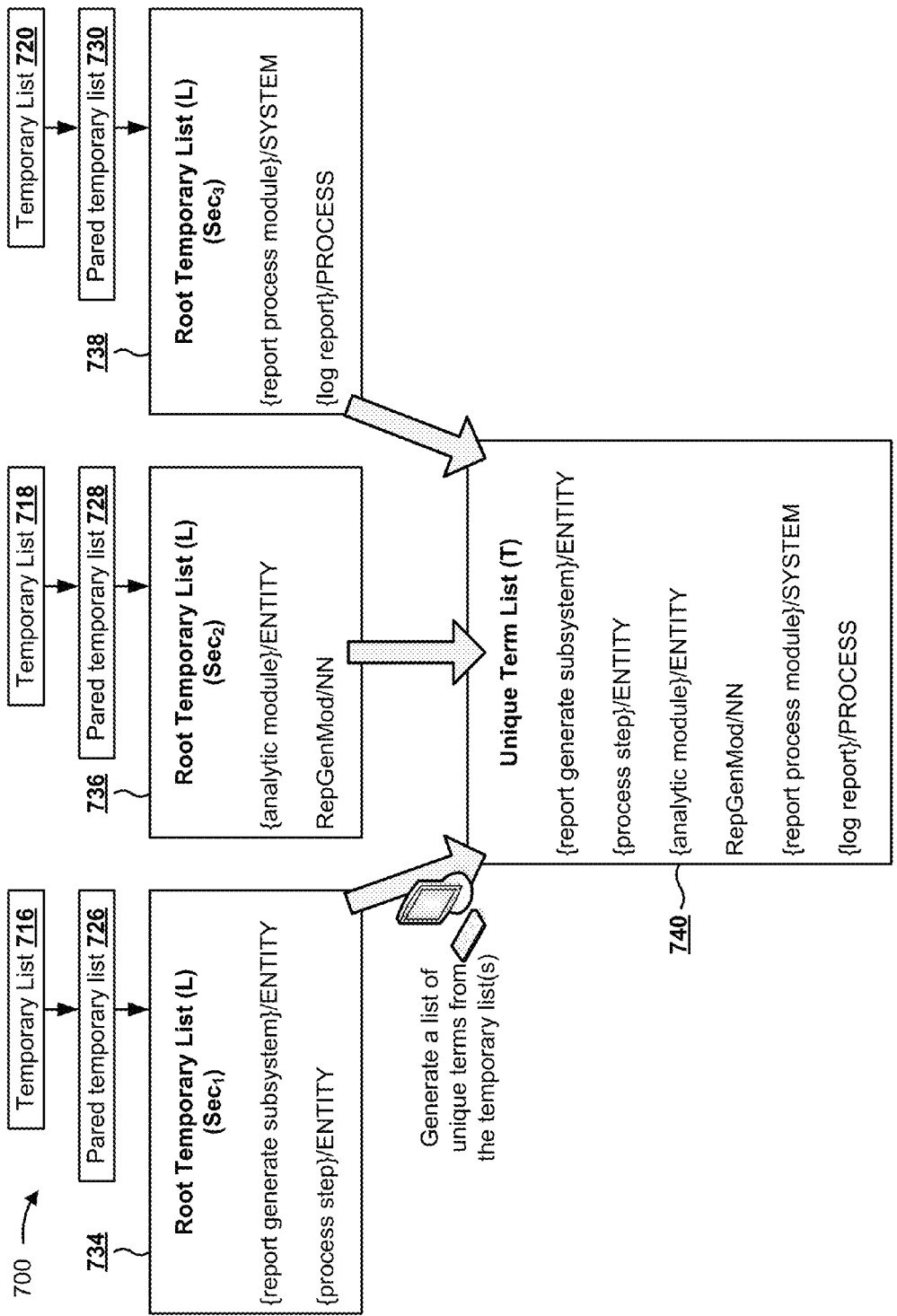

As shown in FIG. 7E, client device 210 may generate a unique term list (T) 740 from root temporary lists 734-738. Client device 210 may generate unique term list 740, for example, by processing temporary lists sequentially. For example, client device 210 may process a first text section, may generate temporary list 716 from the first text section ($Sec_1$), may generate pared temporary list 726 from temporary list 716, may generate root temporary list 734 from pared temporary list 726, and may add the terms in root temporary list 734 to unique term list 740. Client device 210 may process the second text section ($Sec_2$) and the third text section ($Sec_3$) in a similar manner to generate unique term list 740.

In some implementations, client device 210 may only add terms to unique term list 740 (e.g., from a root temporary list) that are not already included in unique term list 740. For example, assume that unique term list 740 includes the term "report generate subsystem," as shown. Based on unique term list 740 including the term "report generate subsystem," client device 210 may not add terms with the same roots (e.g., "report generate subsystem") to unique term list 740, such as the terms "report generating subsystems," "reporting generation subsystem," or the like.

As indicated above, FIGS. 7A-7E are provided merely as an example. Other examples are possible and may differ from what was described with regard to FIGS. 7A-7E.

Figure 8:
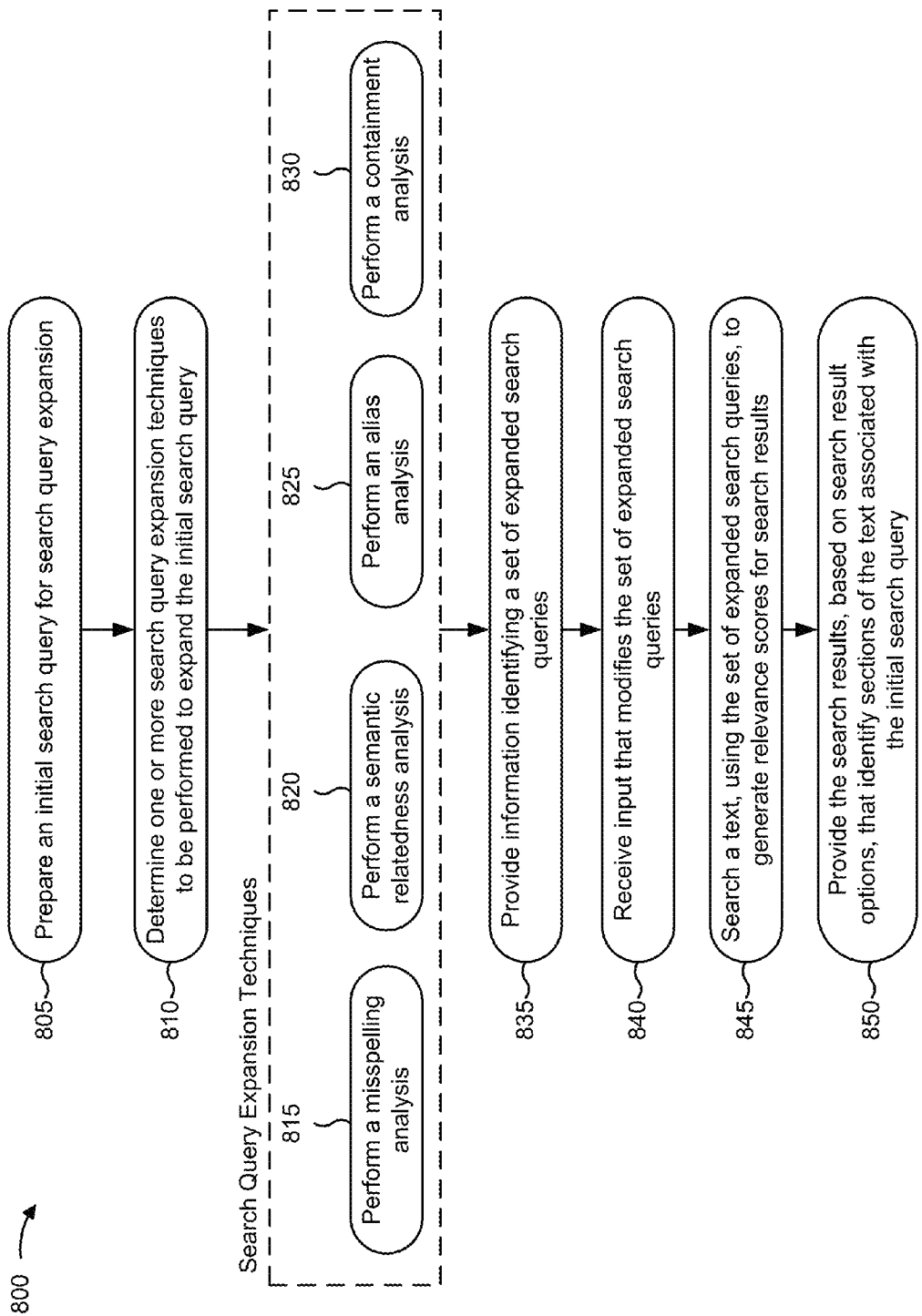
FIG. 8 is a flow chart of an example process for expanding a search query and using the expanded search query to search a text.

FIG. 8 is a flow chart of an example process 800 for expanding a search query and using the expanded search query to search a text. In some implementations, one or more process blocks of FIG. 8 may be performed by client device 210. In some implementations, one or more process blocks of FIG. 8 may be performed by another device or a group of devices separate from or including client device 210, such as server device 220.

As shown in FIG. 8, process 800 may include preparing an initial search query for search query expansion (block 805). For example, client device 210 may prepare an initial search query for search query expansion by inserting delimiters into the initial search query and/or using delimiters to split the initial search query into distinct terms. For example, client device 210 may insert a delimiter as described elsewhere herein in connection with block 610 of FIG. 6. In this way, client device 210 may use a delimiter to more easily parse the text. In some implementations, client device 210 may prepare the initial search query for search query expansion by associating tags with words and/or terms included in the initial search query, as described herein in connection with block 620 of FIG. 6.

Client device 210 may generate a query term list QTokens that includes a list of terms included in the initial search query (e.g., a single term in the case of a single-word search query, a single word and/or multiple words in the case of a multi-word search query, etc.). In some implementations, client device 210 may prevent terms associated with a stop tag or identified as a stop term from being included in the query term list (e.g., of, the, and, etc.). Additionally, or alternatively, client device 210 may convert terms to a root form when adding the terms to the query term list. In some implementations, when client device 210 determines that there are multiple initial search queries to be expanded (e.g., when a user has input multiple search queries), client device 210 generates a query term list QTokens[q] for each initial search query q. In some implementations, the query term list may identify a quantity of times that each term is included in a search query.

As further shown in FIG. 8, process 800 may include determining one or more search query expansion techniques to be performed to expand the initial search query (block 810). For example, client device 210 may determine one or more search query expansion techniques to be performed to expand an initial search query (or a set of initial search queries). In some implementations, client device 210 may receive user input that specifies the search query expansion techniques to be performed, as described elsewhere herein. Additionally, or alternatively, client device 210 may determine one or more default search query expansion techniques to perform (e.g., based on information stored in a data structure). In some implementations, client device 210 may determine the search query expansion technique(s) based on a characteristic of the text (e.g., a size of the text, contents included in the text, a quantity of sections in the text, a quantity of terms in the text, a file format of a file that includes the text, etc.).

A search query expansion technique may include a misspelling analysis, a semantic relatedness analysis, an alias analysis, a containment analysis, etc. Except as otherwise described herein, client device 210 may perform a single search query expansion technique, or may perform any combination of multiple search query expansion techniques. When performing a combination of multiple search query expansion techniques, client device 210 may perform the multiple search query expansion techniques in any order, except as otherwise described herein.

As further shown in FIG. 8, process 800 may include performing a misspelling analysis (block 815). For example, client device 210 may analyze a first term, included in the list of unique terms TermList (e.g., generated as described herein in connection with FIG. 6), to determine whether the first term is a misspelling of a second term included in the initial search query (or whether the second term, included in the initial search query, is a misspelling of the first term included in the list of unique terms). In other words, client device 210 may determine whether the first term and the second term are syntactically similar. For each term u (sometimes referred to as $u_1$ in examples described herein) included in QTokens[q], client device 210 may determine whether any term v (sometimes referred to as $u_2$ in examples described herein) in TermList is a syntactically similar to u. If client device 210 determines that a term v included in TermList is syntactically similar to a term u included in QTokens[q], then client device 210 may add the term v to a list of misspelled terms, $L_{mis}$.

In some implementations, client device 210 may use a language database, such as a dictionary, to determine whether a term is a misspelled term. When a term is included in the language database, client device 210 may determine that the term is not a misspelled term. When the first term or the second term is not included in the language database, client device 210 may calculate a Levenshtein distance (e.g., edit distance) of the terms to determine whether the terms are misspelled terms.

Levenshtein distance may refer to the smallest number of insertion, deletion, and/or substitution operations required to modify a first term to generate a second term. For example, the terms "environment" and "wenvironment" have a Levenshtein distance of one (e.g., an insertion of a single character "w" at the beginning the term "environment"). Similarly, the terms "environment" and "nvironment" have a Levenshtein distance of one (e.g., a deletion of a single character "e" at the beginning the term "environment"). As another example, the terms "environment" and "winvironment" have a Levenshtein distance of two (e.g., an insertion of "w" and a substitution of "e" with "i").

In some implementations, client device 210 may determine that terms are misspelled terms if the Levenshtein distance of the terms satisfies a threshold value (e.g., if the Levenshtein distance is less than a threshold value, such as 2, and/or is equal to a threshold value, such as 1). Additionally, or alternatively, when client device 210 analyzes multi-word terms, client device 210 may determine that the multi-word terms are misspelled terms if the average Levenshtein distance of the words included in the multi-word terms satisfies a threshold value (e.g., is equal to one, is less than or equal to two, etc.). When the terms include a different quantity of words, client device 210 may only consider corresponding words when calculating the average Levenshtein distance, in some implementations.

For example, consider two multi-word terms:
$u_1 = \{w_{11}, w_{12}, \ldots, w_{1n}\}$, and
$u_2 = \{w_{21}, w_{22}, \ldots, w_{2m}\}$.

In the above terms $u_1$ and $u_2$, each $w_{ij}$ represents the j-th word of the i-th term, and $n \le m$. Client device 210 may determine that the terms $u_1$ and $u_2$ are misspelled alias terms if the average Levenshtein distance $\beta_{avg}$ of the words in the terms is less than or equal to a threshold value (e.g., 1). Client device 210 may calculate the average Levenshtein distance $\beta_{avg}$ by summing the Levenshtein distances $\beta_j$ of each corresponding word $w_{1j}$ and $w_{2j}$, and then dividing by the total number of compared words n.

For example, consider two terms with three words each:
$u_1 = \{$Environmental Protection Agency$\}$, and
$u_2 = \{$Envirnmental Protecton Agency$\}$.

In this example, the Levenshtein distance $\beta_1$ for the first pair of corresponding words, $w_{11}=$Environmental and $w_{21}=$Environmental, is equal to 1 (e.g., deleting an "o" from "Environmental"). Similarly, the Levenshtein distance $\beta_2$ for the second pair of corresponding words, $w_{12}=$Protection and $w_{22}=$Protecton, is equal to 1 (e.g., deleting an "i" from "Protection"). Finally, the Levenshtein distance $\beta_3$ for the third pair of corresponding words, $w_{13}=$Agency and $w_{23}=$Agency, is equal to 0 (e.g., the words are identical). Thus, the average Levenshtein distance is equal to ⅔ (e.g., 0.66):

$\beta_{avg} = (\beta_1 + \beta_2 + \beta_3)/n$
$\beta_{avg} = (1+1+0)/3$
$\beta_{avg} = \frac{2}{3} = 0.66$.

Based on this calculation, client device 210 may determine that the terms {Environmental Protection Agency} and {Envirnmental Protecton Agency} are misspelled terms (e.g., since $\beta_{avg} \le 1$).

Additionally, or alternatively, when the terms include a different number of words, client device 210 may compare the number of words in each term to determine whether the terms are misspelled terms. For example, client device 210 may determine the difference between the number of words in the terms (e.g., m−n), and may determine that the terms are possible misspelled terms when the difference is less than or equal to a threshold (e.g., 1). For example, consider the terms:

$u_1 = \{$Environmental Protection Agency$\}$, and
$u_2 = \{$US Envirnmental Protecton Agency$\}$.

In the above example, the number of words n in $u_1$ is equal to 3 (e.g., n=3), and the number of words m in $u_2$ is equal to 4 (e.g., m=4). Client device 210 may determine that the difference between the number of terms in $u_1$ and $u_2$ satisfies a threshold (e.g., m−n≤1). Based on this determination, client device 210 may remove words from the larger term (e.g., $u_2$) that do not correspond to words in the smaller term (e.g., $u_1$), and may determine the average Levenshtein distance of the remaining words. For example, client device 210 may remove the word "US" from $u_2$, and may determine the average Levenshtein distance between {Environmental Protection Agency} and {Envirnmental Protecton Agency}, as described above.

As further shown in FIG. 8, process 800 may include performing a semantic relatedness analysis (block 820). For example, client device 210 may analyze a first term, included in the list of unique terms TermList, to determine whether the first term is a synonym of a second term included in the initial search query. In other words, client device 210 may determine whether the first term and the second term are semantically related. For each term u included in QTokens[q], client device 210 may determine whether any term v in TermList is semantically related to u. If client device 210 determines that a term v included in TermList is semantically related to a term u included in QTokens[q], then client device 210 may add the term v to a list of synonym terms, $L_{syn}$.

In some implementations, client device 210 may use a language database to determine whether two terms are semantically related. The language database may include, for example, an indication of sets of words that are synonyms of one another (e.g., SynSets in a WordNet database). Client device 210 may receive a list of term pairs $u_1$, $u_2$ where $u_1$ is included in QTokens[q] and $u_2$ is included in TermList. Client device 210 may use the language database to compare pairs of terms $u_1$, $u_2$. For example, client device 210 may compare terms $u_1$ and $u_2$:

$u_1 = \{(w_{11}, p_{11}), (w_{12}, p_{12}), \ldots, (w_{1n}, p_{1n})\}$
$u_2 = \{(w_{21}, p_{21}), (w_{22}, p_{22}), \ldots, (w_{2m}, p_{2m})\}$ where $w_{ij}$ represents the j-th word in the i-th term, where represents a tag associated with word $w_{ij}$, where n+m>2 (e.g., at least one of the terms is a multi-word term), and where n≤m.

Client device 210 may determine whether at least one word in $u_1$ and at least one word in $u_2$ is included in the language database (e.g., in a WordNet database, which indicates that the word is a dictionary word). If not, client device 210 may skip a glossary analysis of the term. Otherwise, client device 210 may perform the glossary analysis.

To perform the glossary analysis, client device 210 may use the language database to determine a list of synonyms for each word of $u_1$ and $u_2$ based on the tags of $u_1$ and $u_2$ (e.g., part of speech tags). For example, client device 210 may generate a list $L_{ij}$ that includes synonym pairs, for the word $w_{ij}$, that correspond to tag $p_{ij}$. For each pair $(w_{1i}, w_{2j})$ from the list $(w_{11}, w_{21}), \ldots, (w_{1n}, w_{2m})$, client device 210 may calculate:

$$r_{ij} = \frac{|L_{1i} \cap L_{2j}|}{|L_{1i} \cup L_{2j}|}$$

In other words, client device 210 may set $r_{ij}$ equal to one when $L_{1i} \cap L_{2j}$ is not an empty set. Otherwise, client device 210 may set $r_{ij}$ equal to zero.

Client device 210 may determine a synonym score s for the pair of terms. In some implementations, the synonym score s may be based on a quantity of times that at least one synonym of a word in the first term $u_1$ matches a synonym of a word (or the word itself) in the second term $u_2$. For example, the synonym score s may include a quantity of times that a synonym set of a word in the first term $u_1$ shares a word with (e.g., overlaps with) a synonym set of a word in the second term $u_2$. In some implementations, a synonym set of a word may include the word. As another example, the synonym score s may include a quantity of shared synonyms between words in the first term $u_1$ and words in the second term $u_2$. In some implementations, client device 210 may calculate the synonym score as follows:

$$\gamma = \frac{2 \sum_{1 \leq i \leq n} \max_{1 \leq j \leq m} \{r_{ij}\}}{n + m}$$

Client device 210 may compare the synonym score (e.g., $\gamma$ or s) to a glossary threshold $\delta$ (e.g., a threshold between 0 and 1). In some implementations, client device 210 may determine the glossary threshold $\delta$ based on user input. Additionally, or alternatively, client device 210 may determine the glossary threshold $\delta$ based on characteristics of the terms $u_1$ and/or $u_2$.

In some implementations, client device 210 may determine the glossary threshold $\delta$ based on a quantity of words of the first and/or second term that are included in the language database. As an example, assume that the first term $u_1$ includes a single word $w_1$, and the second term $u_2$ includes two or more words $w_2, w_3, \ldots, w_m$. If the single word $w_1$ of $u_1$ is included in the language database, client device 210 may set the glossary threshold $\delta$ to a first value (e.g., 1). If the single word $w_1$ of $u_1$ is not included in the language database, client device 210 may set the glossary threshold $\delta$ to a second value (e.g., 0).

Alternatively, if the single word $w_1$ of the first term $u_1$ is not included in the language database, client device 210 may set the glossary threshold $\delta$ based on a quantity of words of the second term $u_2$ included in the language database. For example, if two or more of the words (e.g., if all of the words) of the second term $u_2$ are included in the language database, then client device 210 may set the glossary threshold $\delta$ to the first value (e.g., 1). Otherwise, if fewer than two of the words of the second term $u_2$ are included in the language database, then client device 210 may set the glossary threshold $\delta$ to the second value (e.g., 0).

In some implementations, client device 210 may determine a quantity of words (e.g., a quantity of unique words) included in both terms (e.g., m+n), and may determine the glossary threshold $\delta$ based on the quantity of words included in both terms. For example, client device 210 may set the glossary threshold $\delta$ to the first value (e.g., 1) if a quantity or percentage of the words included in the language database satisfies a threshold (e.g., 4 out of 5 terms included in the database, where the threshold of 4 is determined by m+n−1). Otherwise, if the quantity or percentage of words included in the language database does not satisfy the threshold, then client device 210 may set the glossary threshold $\delta$ to the second value (e.g., 0).

In some implementations, client device 210 may determine a quantity of shared words included in both terms (e.g., a quantity of words included in the first term and also included in the second term), and may determine the glossary threshold $\delta$ based on the quantity of shared words. For example, if all of the words of the first term are included in the second term, then client device 210 may set the glossary threshold $\delta$ to the second value (e.g., 0). Alternatively, if the quantity of shared words satisfies a threshold (e.g., n−1), then client device 210 may set the glossary threshold $\delta$ to the second value (e.g., 0). Otherwise, if the quantity of shared words does not satisfy the threshold, then client device 210 may set the glossary threshold $\delta$ to the first value (e.g., 1).

In some implementations, setting the glossary threshold $\delta$ to the first value (e.g., 1) may cause client device 210 to prevent the term $u_2$ (e.g., included in TermList) from being added to the list of synonym terms, $L_{syn}$. Conversely, setting the glossary threshold $\delta$ to the second value (e.g., 0) may cause client device 210 to add the term $u_2$ to the list of synonym terms, $L_{syn}$.

Once client device 210 has determined the glossary threshold $\delta$, client device 210 may compare the synonym score (e.g., $\gamma$ or s) to the glossary threshold $\delta$. Based on whether the synonym score, associated with a pair of terms, satisfies the glossary threshold $\delta$, client device 210 may add or prevent addition of the term $u_2$ to the list of synonym terms, $L_{syn}$. For example, if the synonym score is greater than or equal to the glossary threshold, then client device 210 may add the term $u_2$ to the list of synonym terms, $L_{syn}$.

As an example, assume that client device 210 has set the glossary threshold $\delta=2/3$. Further assume that $u_1=\{US/NNP\ Environmental/JJ\ Protection/NN\ Agency/NN\}$ and $u_2=\{Climatic/JJ\ Safeguard/NN\ Bureau/NN\}$. Assume that in the language dictionary, the following pairs of terms are determined to be synonyms: {Environmental, Climatic}, {Protection, Safeguard}, and {Agency, Bureau}. Based on determining these three matches, client device 210 may set the synonym score s=3. Client device 210 may calculate a new synonym score $\gamma=(2\times s)/(n+m)=6/7$. Because $6/7>2/3$, client device 210 may add $u_2$ to the list of synonym terms, $L_{syn}$.

Additionally, or alternatively, client device 210 may calculate a latent semantic similarity score to determine whether two terms are semantically related. Client device 210 may calculate a latent semantic similarity score for a pair of terms $u_1, u_2$. The latent semantic similarity score may be calculated as the cosine of the angular distance between the term vectors $U[u_1]$ and $U[u_2]$, and may be calculated as follows:

$$\text{Cosine}(X, X', n) = \frac{\sum_{l=1}^{l=n} X[l]X'[l]}{\sqrt{\sum_{l=1}^{l=n} X[l]^2} \sqrt{\sum_{l=1}^{l=n} X'[l]^2}}$$

The latent semantic similarity score may be calculated as SemSim[i, j]=Cosine(V[i],V[j],k), where V[i] and V[j] are section vectors from the truncated matrix V, where i and j are included in [1, ..., d], and where i<j. The SemSim score may range from [−1, 1], where −1 indicates that the terms are antonyms, 0 indicates that the terms are statistically independent, and 1 indicates that the terms are synonyms.

In some implementations, client device 210 may set a semantic threshold value $\delta_{sem}$ (e.g., 0.9) and/or may receive information that identifies a semantic threshold value. Client device 210 may compare SemSim[$u_1$, $u_2$] to the semantic threshold value to determine whether the term $u_2$ should be added to the list of synonym terms, $L_{syn}$. For example, if SemSim[$u_1$, $u_2$]>$\delta_{sem}$, then client device 210 may add the term $u_2$ to the list of synonym terms, $L_{syn}$.

In some implementations, client device 210 may determine not to perform a semantic relatedness analysis. In this case, client device 210 may calculate a similarity score as SemSim[i, j]=Cosine($C^T$[i],$C^T$[j],t), where $C^T$[i] and $C^T$[j] are section vectors from the transposed co-occurrence matrix $C^T$, where i and j are included in [1, ..., d], and where i<j.

As further shown in FIG. 8, process 800 may include performing an alias analysis (block 825). For example, client device 210 may analyze a first term, included in the list of unique terms TermList, to determine whether the first term is an alias of a second term included in the initial search query. For each term u included in QTokens[q], client device 210 may determine whether any term v in TermList is an alias of u. If client device 210 determines that a term v included in TermList is an alias of a term u included in QTokens[q], then client device 210 may add the term v to a list of alias terms, $L_{alias}$.

As an example, client device 210 may analyze two or more terms to determine whether the terms are short form alias terms (e.g., an acronym, an abbreviation, etc.). In some implementations, client device 210 may use a language database to determine whether the terms are short form alias terms. When a term is included in the language database, client device 210 may determine that the term is not a short form alias term. Alternatively, when a term is included in the language database, client device 210 may determine that the term is a possible short form alias term if the term appears in capital letters in the text (e.g., "ACT" being an acronym), and/or appears before a period in the text (e.g., "pot." being an abbreviation of potential).

Client device 210 may determine that two terms are short form alias terms by determining that a first term, SF, is shorter in length than the second term, LF (e.g., SF includes a smaller number of characters than LF), and/or by determining that SF and LF begin with the same character (e.g., the same letter). In some implementations, client device 210 may modify SF and/or LF by removing a period from SF and/or LF (e.g., "env. prot. agency" may be modified to "env prot agency").

In some implementations, client device 210 may determine that SF and LF are short form alias terms based on determining that SF is an acronym of LF. Client device 210 may determine that SF is an acronym of LF by determining that each letter in SF matches a corresponding first letter of each word in LF. For example, client device 210 may determine that "EPA" is a short form alias term of "Environmental Protection Agency" because each letter of "EPA" matches a corresponding first letter of each word in "Environmental Protection Agency." Additionally, or alternatively, client device 210 may determine that SF includes all capital letters before considering SF as a possible acronym.

Additionally, or alternatively, client device 210 may determine that SF appears in the text enclosed by parentheses before considering SF as a possible acronym. Additionally, or alternatively, client device 210 may determine that SF appears in the text within a threshold number of words of LF before considering SF as a possible acronym (e.g., SF appears in parentheses immediately after LF in the text).

In some implementations, client device 210 may determine that SF and LF are short form alias terms based on determining that SF is a prefix of LF. Client device 210 may determine that SF is a prefix of LF by determining that a threshold number of letters at the beginning of SF match corresponding letters at the beginning of LF. For example, client device 210 may determine that "env" is a short form alias term of "environment" because the first three letters of "env" match the first three letters of "environment." Additionally, or alternatively, client device 210 may determine that SF ends with a period before considering SF as a possible prefix (e.g., an abbreviation).

When LF and/or SF is a multi-word term, client device 210 may determine that SF and LF are short form alias terms based on determining that multiple words in SF are prefixes of corresponding words in LF. Client device 210 may determine that SF is a short form alias term of LF based on a threshold number of words in SF (e.g., all of the words) being prefixes of corresponding words in LF. For example, client device 210 may determine that "env. prot. ag" is a short form alias term of "environmental protection agency" by determining that "env" is a prefix of "environmental," "prot" is a prefix of "protection," and "ag" is a prefix of "agency."

In some implementations, client device 210 may determine that SF and LF are short form alias terms based on determining that SF can be generated from LF by deleting characters from LF. For example, client device 210 may determine that "mtc" is a short form alias term of "matching" because the "mtc" can be generated from "matching" by deleting characters from "matching."

When LF and/or SF is a multi-word term, client device 210 may determine that SF and LF are not short form alias terms when a residual string, determined based on generating SF from LF by deleting characters from LF, includes a particular character, such as a space. The residual string may include a string of characters in LF that immediately follow the last matching character (e.g., the last matching character between LF and SF), up to and including the last character of LF. For example, assume that SF="pdef" and LF="period defined." The residual string of this example is "fined." This residual string does not include a space, so client device 210 may consider "pdef" and "period defined" as short form alias terms (e.g., based on being able to generate SF from LF by deleting characters from LF). As another example, assume that SF="web sit" and LF="web site exchange." The residual string of this example is "e exchange." This residual string includes a space, so client device 210 may not consider "web sit" and "web site exchange" as short form alias terms.

Client device 210 may use one or more of the above techniques to determine whether terms are short form alias terms. In some implementations, client device 210 may first determine whether SF is an acronym of LF. If client device 210 determines that SF is not an acronym of LF, client device 210 may then determine whether SF is a prefix of LF (or whether multiple words in SF are prefixes of corresponding words in LF). If client device 210 determines that SF is not a prefix or LF (or that multiple words in SF are not prefixes of corresponding words in LF), client device 210 may then determine whether SF can be generated from LF by deleting characters from LF. If client device 210 determines that SF can be generated from LF by deleting characters from LF, client device 210 may determine whether a residual string includes a particular character (e.g., a space). In performing the analysis in this manner, client device 210 may determine whether SF and LF are short form alias terms without being required to perform every analysis for each pair of terms SF and LF.

As another example, client device 210 may analyze two or more terms to determine whether the terms are explicit alias terms. In some implementations, client device 210 may determine whether the terms are explicit alias terms based on an alias character pattern, such as "is also known as." Client device 210 may receive information (e.g., from a user and/or from another device) that identifies one or more alias character patterns to use to determine whether terms are explicit alias terms. Example alias character patterns include: "aka," "also known as," "sometimes also known as," "generally also known as," "generally known as," "better known as," "will be referred to as," "will be referred to henceforth as," "also called," "also called as," "will be used instead of," "will be mentioned as," "written as," "will be written as," "is an alias of," etc.

Client device 210 may determine that two terms are explicit alias terms when an alias character pattern is included in the text in between the terms, and/or within a threshold number of words between the terms. For example, using the alias character pattern "also known as," client device 210 may determine that "hot dog" and "ballpark frank" are explicit alias terms, based on any of the following being included in the text:

A hot dog, also known as a ballpark frank . . .
A hot dog is also known as a ballpark frank.
A hot dog may also be known as a ballpark frank.

As can be seen, additional words may appear before, after, and/or within the alias character pattern. Client device 210 may determine that the two terms are explicit alias terms based on the number of additional words, appearing before, after, and/or within the alias character pattern, satisfying a threshold (e.g., less than 3).

If client device 210 determines that a term v included in TermList is an alias of a term u included in QTokens[q] (e.g., a short form alias, an explicit alias, etc.), then client device 210 may add the term v to a list of alias terms, $L_{alias}$.

As further shown in FIG. 8, process 800 may include performing a containment analysis (block 830). For example, client device 210 may analyze a first term, included in the list of unique terms, to determine whether any words included in the first term are also included in a second term of the initial search query. In some implementations, client device 210 may expand the search query list QTokens[q] to include terms identified as misspelled terms in list $L_{mis}$[q], terms identified as semantic terms in list $L_{syn}$[q], and/or terms identified as alias terms in list $L_{alias}$[q]. For example, client device 210 may expand QTokens as follows:

ExQTokens[q]=QToken[q]∪$L_{mis}$ ∪$L_{alias}$

For each term u included in ExQTokens[q], client device 210 may determine whether any term v in TermList includes any word included in term u. If client device 210 determines that a term v included in TermList includes any word included in term u from ExQTokens[q], then client device 210 may add the term v to a list of containment terms, $L_{tc}$.

As an example, assume that the term "record management system" is a term v included in TermList. Client device 210 may add this term "record management system" to the list of containment terms, $L_{tc}$, for example search queries that includes "Management system should print access log" (e.g., since the words management and system are included in both v and u), "Managmnt systm" (e.g., since the misspelled terms are included in the extended query list), and "sys should print access log" (e.g., since the short form "sys" is included in the extended query list). Once client device 210 has finished performing the containment analysis, client device 210 may extend the extended query list to include terms in the list $L_{tc}$.

As further shown in FIG. 8, process 800 may include providing information identifying a set of expanded search queries (block 835), and receiving input that modifies the set of expanded search queries (block 840). For example, client device 210 may provide the set of expanded search queries (e.g., the extended query list ExQTokens) for display via a user interface. Client device 210 may receive input from a user via the user interface. The user input may cause client device 210 to add a search query to the set of expanded search queries, to remove a search query from the set of expanded search queries, to modify a search query included in the set of expanded search queries, etc.

As further shown in FIG. 8, process 800 may include searching a text, using the set of expanded search queries, to generate relevance scores for search results (block 845). For example, client device 210 may search a text (e.g., a text identified by a user, a text used to expand the search queries, etc.) using the set of expanded search queries. Based on the search, client device 210 may determine relevance scores for search results (e.g., sections of the text).

As an example, client device 210 may generate a query array Q of size 1×t (e.g., $[Q]_{1 \times t}$), and may initialize all elements of Q to zero. For each term u in the extended query list ExQTokens[q], client device 210 may determine whether there is a term v in the TermList that matches u. For a particular term TermList[k], if TermList[k]=u, then client device 210 may calculate a frequency score for the term, and may store the frequency score in Q[k]. Client device 210 may calculate the frequency score Q[k] based on a quantity of occurrences of term u in the list ExQTokens[q] and a combined weight p calculated for term v. The combined weight p may be calculated as a sum of one or more individual weights associated with a search query expansion technique. For example, p may be calculated as:

$$p=\partial_{mis}+\partial_{alias}+\partial_{tc}$$

In the above expression, client device 210 may set $\partial_{mis}$ equal to a weight assigned to a misspelling analysis if the term u is included in the misspelling list $L_{mis}$, and may set $\partial_{mis}$ equal to zero if the term u is not included in the misspelling list $L_{mis}$. Similarly, client device 210 may set $\partial_{alias}$ equal to a weight assigned to an alias analysis if the term u is included in the alias list $L_{alias}$, and may set $\partial_{alias}$ equal to zero if the term u is not included in the alias list $L_{alias}$. Similarly, client device 210 may set $\partial_{tc}$ equal to a weight assigned to a containment analysis if the term u is included in the containment list $L_{tc}$, and may set $\partial_{tc}$ equal to zero if the term u is not included in the containment list $L_{tc}$. Client device 210 may determine the weights based on user input, as described herein in connection with block 430 of FIG. 4.

Client device 210 may calculate the quantity of occurrences f of term u within the expanded search query list ExQTokens. Client device 210 has determined the combined weight p and the quantity of occurrences f for a particular term, client device 210 may calculate the frequency score Q[k] for the term as follows:

$$Q[k]=f \times p$$

Client device 210 may apply information theoretic weighting to the frequency score Q[k] to weight the score in relation to the text as a whole. For example, for each k in [0, t−1], client device 210 may calculate an information theoretic weighted frequency score as follows:

$$Q[k]=Q[k]\times IDF_k$$

In the above expression, $IDF_k$ may be calculated as follows:

$$IDF_k = \ln\left(\frac{d}{n_i+1}\right)$$

where d is the total number of sections of the text and n, is the total number of sections where the $i^{th}$ term appears.

If client device 210 determines that a latent semantic search is to be performed (e.g., based on user input), then client device 210 may map Q to the latent semantic analysis space, such as by calculating the following:

$$[Q_{new}]_{1\times k}=[Q]_{1\times t}[U]_{t\times k}[\Sigma_{k\times k}]^{-1}$$

In the above expression, $Q_{new}$ represents the mapped matrix Q, U represents a t×k unitary matrix (e.g., described elsewhere herein in connection with singular value decomposition), and $\Sigma^{-1}$ represents the matrix inverse of sigma matrix Σ (e.g., described elsewhere herein in connection with singular value decomposition) when only the first k rows and the first k columns are selected.

Client device 210 may calculate a cosine similarity between a text section $Sec_i$, included in truncated matrix $V_{d\times k}$, and the search query q included in query vector $Q_{new}$, as follows:

$$Closeness[q,i]=Cosine(Q_{new},Sec_i,k)$$

If client device 210 determines that a latent semantic search is not to be performed (e.g., based on user input), then client device 210 may map Q to the tf-idf space as $[Q_{new}]_{1\times t}=[Q]_{1\times t}$. Similarly, client device 210 may calculate a cosine similarity between a text section $Sec_i$, included in transposed co-occurrence matrix $C^T_{d\times t}$, and the query vector $Q_{new}$, as follows:

$$Closeness[q,i]=Cosine(Q_{new},Sec_i,t)$$

For each text section $Sec_i$ included in a result $Result_q$ for search query q, client device 210 may determine a relevance score. As an example, client device 210 may calculate the relevance score as follows:

$$Rel[q, i] = \alpha \times Closeness[q, i] + (1-\alpha) \times CQ[i, q],$$

where $$CQ[i, q] = \frac{1}{d-1} \sum_{k\in[1...d], k\neq i} Closeness[q, k] \times SemSim[i, k]$$

In the above expression, CQ[i,q] may represent a clustering quality of the $i^{th}$ search result $Sec_i$ with respect to query q in the query list. CQ[i,q] may represent a measure of how strongly $Sec_i$ clusters around the query (e.g., how many sections, which are similar to the query, are also similar to $Sec_i$). The variable α may represent a configurable weight value between zero and one (e.g., with a default value of 0.5). Client device 210 may use the relevance score when ranking search results.

As further shown in FIG. 8, process 800 may include providing the search results, based on search result options, that identify sections of the text associated with the initial search query (block 850). For example, client device 210 may provide search results for a search query based on a relevance score. The search results may identify one or more sections of the text (e.g., $Sec_i$) associated with a search query (e.g., based on a relevance score). In some implementations, client device 210 may rank the search results from highest to lowest relevance score. Additionally, or alternatively, client device 210 may provide search results for display based on one or more search options.

As an example, if client device 210 determines (e.g., based on user input) that search results are not to overlap, then client device 210 may distribute the search results (e.g., the text sections) into groups around each search query based on a relevance score between a text section and the search query. For example, client device 210 may associate a text section with a search query with which the text section has the highest relevance score (e.g., as compared to relevance scores between the text section and other search queries). Client device 210 may provide a list of search results associated with each search query, and may rank the search results from highest relevance score to lowest relevance score, ensuring that no search result is provided in association with more than one search query.

If client device 210 determines that search results are to overlap, then client device 210 may provide a list of search results associated with each search query, and may rank the search results from highest relevance score to lowest relevance score for a particular search query. In this case, client device 210 may permit a search result to be provided in association with more than one search query.

In some implementations, client device 210 may determine not to cluster search results. In this case, client device 210 may provide a list of search results sorted based on relevance scores.

In some implementations, client device 210 may determine to cluster search results based on relevancy. In this case, client device 210 may create relevancy categories that include search results with a relevance score that falls within a particular range. For example, client device 210 may create relevancy categories of high relevance (e.g., search results with a relevance score and/or cosine similarity between 0.8 and 1), medium-high relevance (e.g., search results with a relevance score and/or cosine similarity between 0.5 and 0.8), average relevance (e.g., search results with a relevance score and/or cosine similarity between 0.25 and 0.5), low relevance (e.g., search results with a relevance score and/or cosine similarity between 0 and 0.25), and no relevance (e.g., search results with a relevance score and/or cosine similarity between −1 and 0).

In some implementations, client device 210 may determine to cluster search results based on a degree of relatedness of search results. In this case, client device 210 may rank search results from highest to lowest relevancy scores to generate a cluster list $C_Q$. In some implementations, client device 210 may remove search results from the cluster list (e.g., may remove a threshold quantity of search results with the lowest relevancy scores). For each pair of search results included in $C_Q$, client device 210 may determine a combined relevance score for the pair. For example, client device 210 may determine a combined relevance score by summing the relevance scores for each search result in the pair. Client device 210 may select a particular quantity of search result pairs (e.g., one-quarter of the search results included in $C_Q$), and may include these search results in the list $C_{top}$.

Client device 210 may calculate a weighted clustering coefficient (WCC) value for each search result $R_l$ included in $C_Q$. Client device 210 may initialize the WCC value for the search result $R_l$ by setting the WCC value to zero, and may determine a maximum edge weighted sum, as follows:

$$WCC[R_l] = 0$$

$$\text{Max}EdgeWeightSum = \frac{2}{|C_Q|(|C_Q|-1)}$$

where $|C_Q|$ represents the number of elements included in $C_Q$.

Client device 210 may determine two other search results $R_{j1}$ and $R_{j2}$ included in $C_Q$. Client device 210 may determine whether both of the other search results $R_{j1}$ and $R_{j2}$ are included in the list $C_{top}$. If both of the other search results $R_{j1}$ and $R_{j2}$ are included in the list $C_{top}$, then client device 210 may determine whether either of the search result pairs of $(R_l, R_{j1})$ or $(R_l, R_{j2})$ are included in the list $C_{top}$. If either of these pairs is included in the list $C_{top}$, then client device 210 may update the WCC value for $R_l$ as follows:

$$WCC[R_l] = WCC[R_l] + SemSim[R_{j1}, R_{j2}]$$

Client device 210 may continue to update the WCC value for $R_l$ until all other search results in $C_{top}$ have been analyzed. After analyzing all search result values, client device 210 may normalize the WCC value for $R_l$ as follows:

$$WCC[R_l] = \frac{WCC[R_l]}{\text{Max}EdgeWeightSum}$$

Client device 210 may calculate a WCC value for each search result, and may sort the search results from highest to lowest WCC value. Client device 210 may select a top quantity of search results with the highest WCC values (e.g., the top quartile), and may center the remaining search results around these top search results. For example, client device 210 may use a k-means clustering technique to cluster a search result into a cluster with which the search result has a highest average (e.g., mean) similarity, as compared to other clusters.

For example, assume that $L = [R_{l1}, \ldots, R_{lm}]$ represents the top quartile of search results with the highest WCC scores. From these search results, client device 210 may create initial clusters $Y_1 = \{R_{l1}\}, Y_2 = \{R_{l2}\}, \ldots, Y_m = \{R_{lm}\}$. Then, for each $R_l$ included in $C_Q$, client device 210 may calculate a mean similarity of $R_l$ with respect to each cluster Y, and may add $R_l$ to the cluster with which $R_l$ has the highest mean similarity. Client device 210 may calculate the mean similarity of $R_l$ with respect to cluster $Y_k$ as follows:

$$MeanSimilarity(R_l, Y_k) = \frac{\sum_{R_a \in Y_k} SemSim[R_l, R_a]}{|Y_k|}$$

In some implementations, client device 210 may iterate through all of the search results a threshold quantity of times to determine final clusters. Additionally, or alternatively, client device 210 may iterate through all of the search results until there is no change in the elements included in the clusters. Client device 210 may provide the clusters for display. In this way, the user may be able to see clusters of search results, associated with a search query, that are related to one another.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIGS. 9A-9F are diagrams of an example implementation 900 relating to example process 800 shown in FIG. 8. FIGS. 9A-9F show an example of expanding a search query and using the expanded search query to search a text. For the purpose of FIGS. 9A-9F, assume that a user and client device 210 have performed the operations described herein in connection with example implementation 500 shown in FIGS. 5A and 5B and example implementation 700 shown in FIGS. 7A-7E.

Figure 9A:
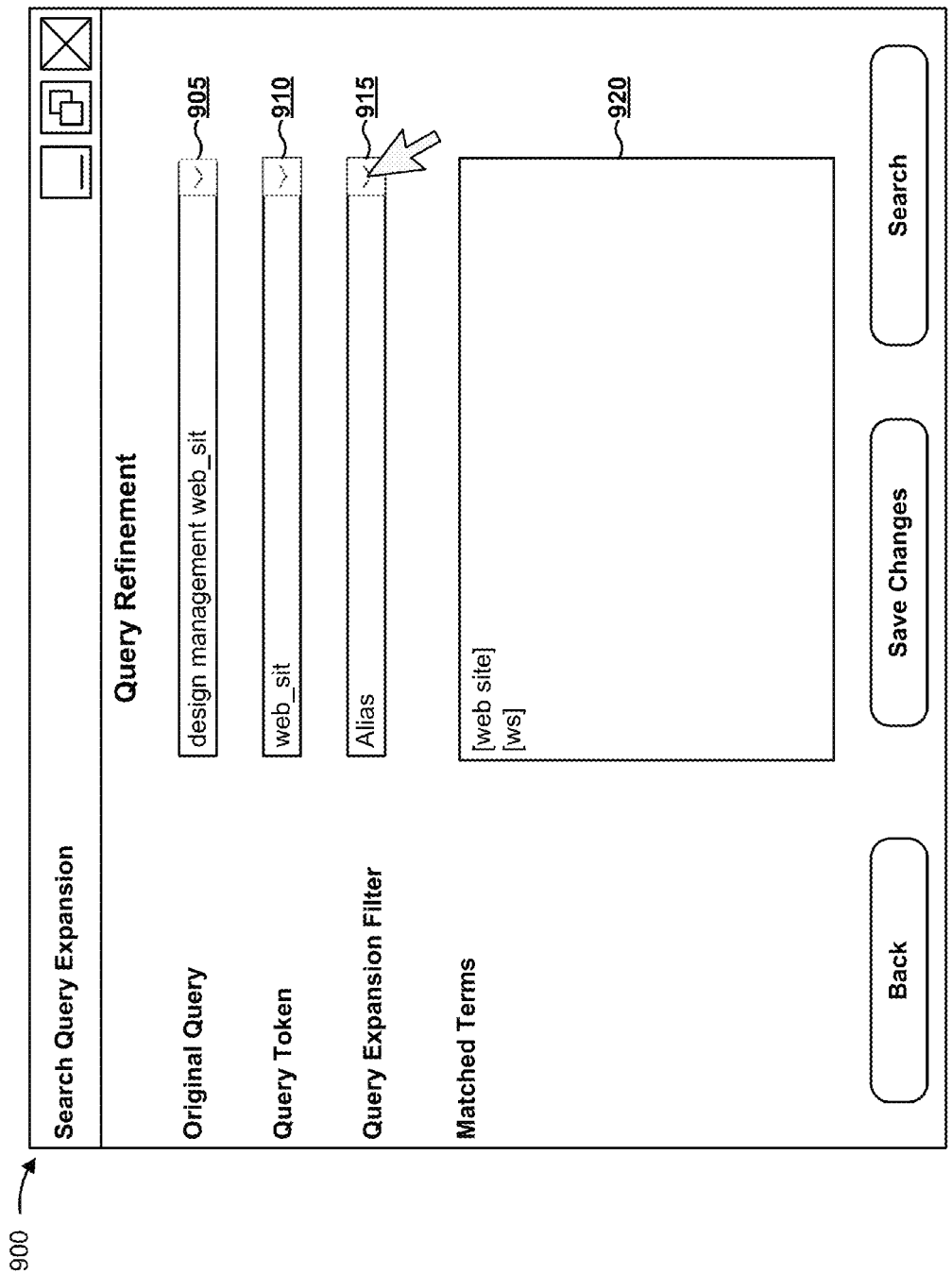

As shown in FIG. 9A, client device 210 may provide a user interface that permits a user to refine a search query. As shown by reference number 905, the user may select an initial search query from multiple search queries initially input by the user. As shown by reference number 910, the user may select a particular term included in the selected search query. For example, for the search query "design management web_sit," the user may select the terms "design," "management," or "web_sit." As shown by reference number 915, the user may select a particular search query expansion technique. Based on the user selection of an initial search query, a term within the initial search query, and a search query expansion technique, client device 210 may provide information that identifies related search queries to be included in a set of expanded search queries for the initial search query.

For example, assume that client device 210 performed the selected "alias" search query expansion technique on the term "web_sit" within the search query "design management web_sit." Assume that client device 210 applied the search query expansion technique to a text, and identified the terms "web site" and "ws" as being expanded search queries. As shown by reference number 920, client device 210 may provide information that identifies these terms for display. As further shown in FIG. 9A, assume that the user interacts with an input mechanism to change the selected "alias" search query expansion technique.

Figure 9B:
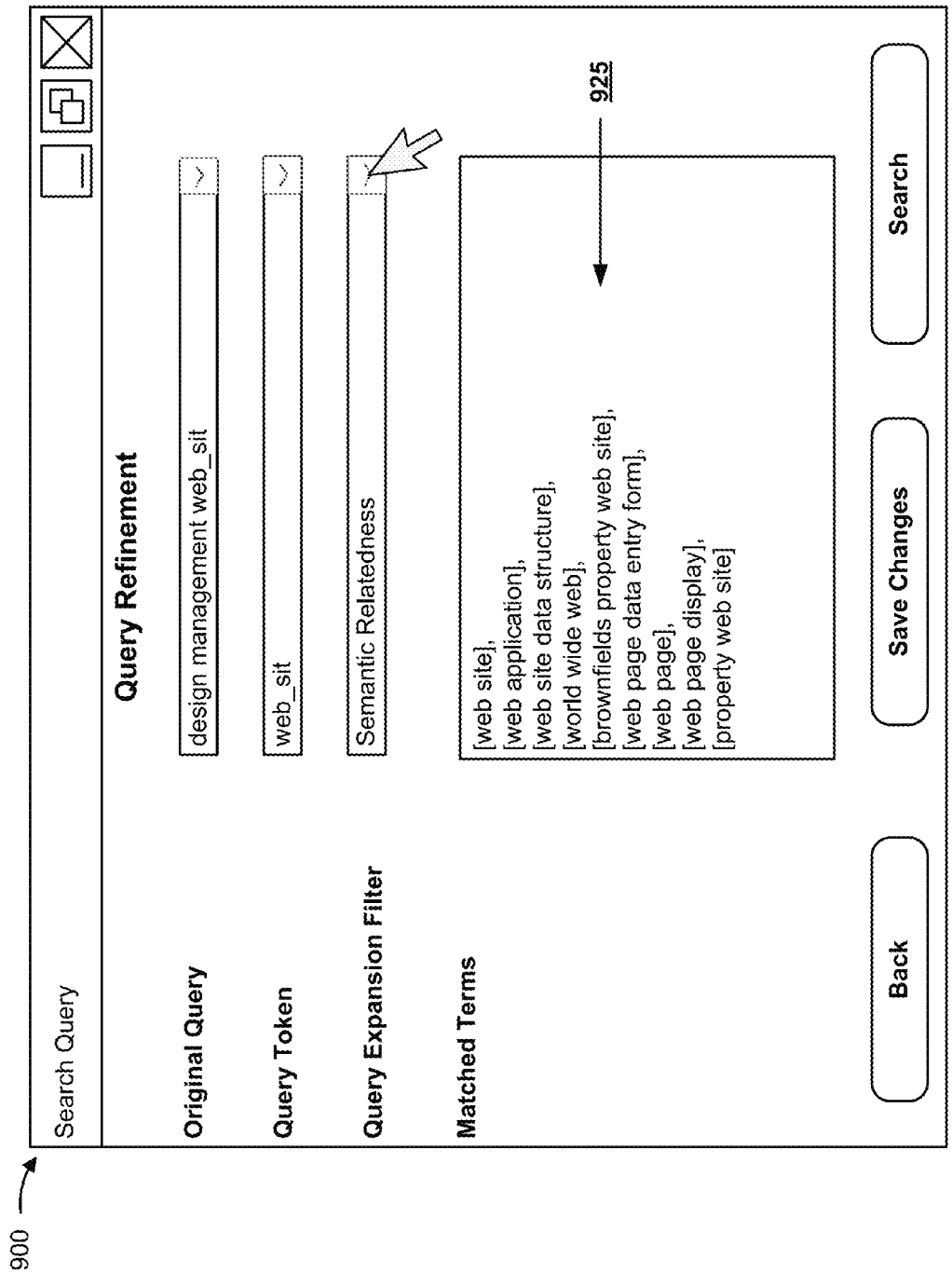

As shown in FIG. 9B, assume that the user changes the "alias" search query expansion technique to a "semantic relatedness" search query expansion technique. Based on this change, client device 210 updates the subset of expanded search queries provided for display, as shown by reference number 925. As further shown in FIG. 9B, assume that the user interacts with an input mechanism to change the selected "semantic relatedness" search query expansion technique.

Figure 9C:
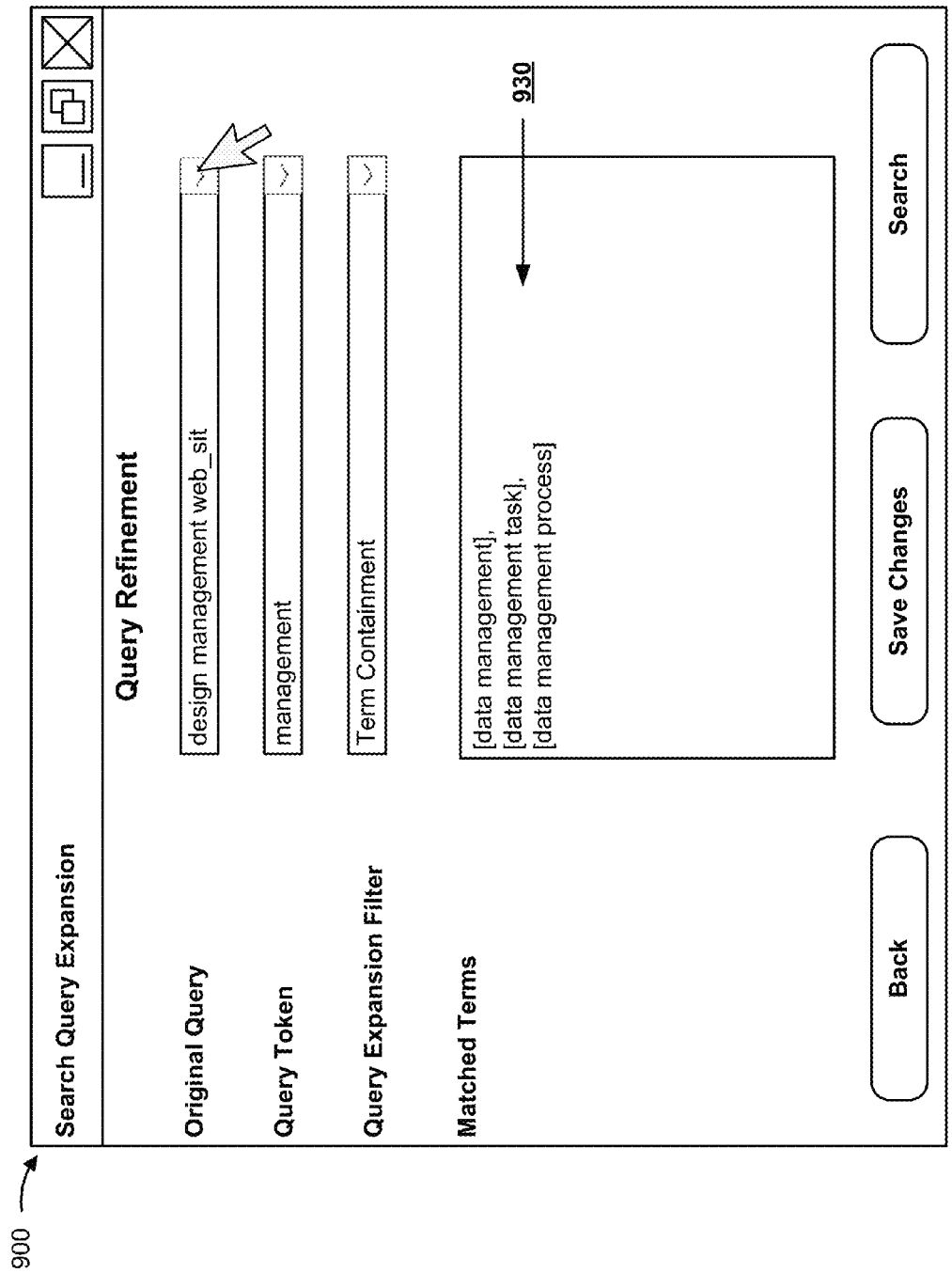

As shown in FIG. 9C, assume that the user changes the "semantic relatedness" search query expansion technique to a "term containment" search query expansion technique. Further, assume that the user changes the "web_sit" term to a "management" term included in the search query "design management web_sit." Based on this change, client device 210 updates the subset of expanded search queries provided for display, as shown by reference number 930. As further shown in FIG. 9C, assume that the user interacts with an input mechanism to change the selected "design management web_sit" search query.

Figure 9D:
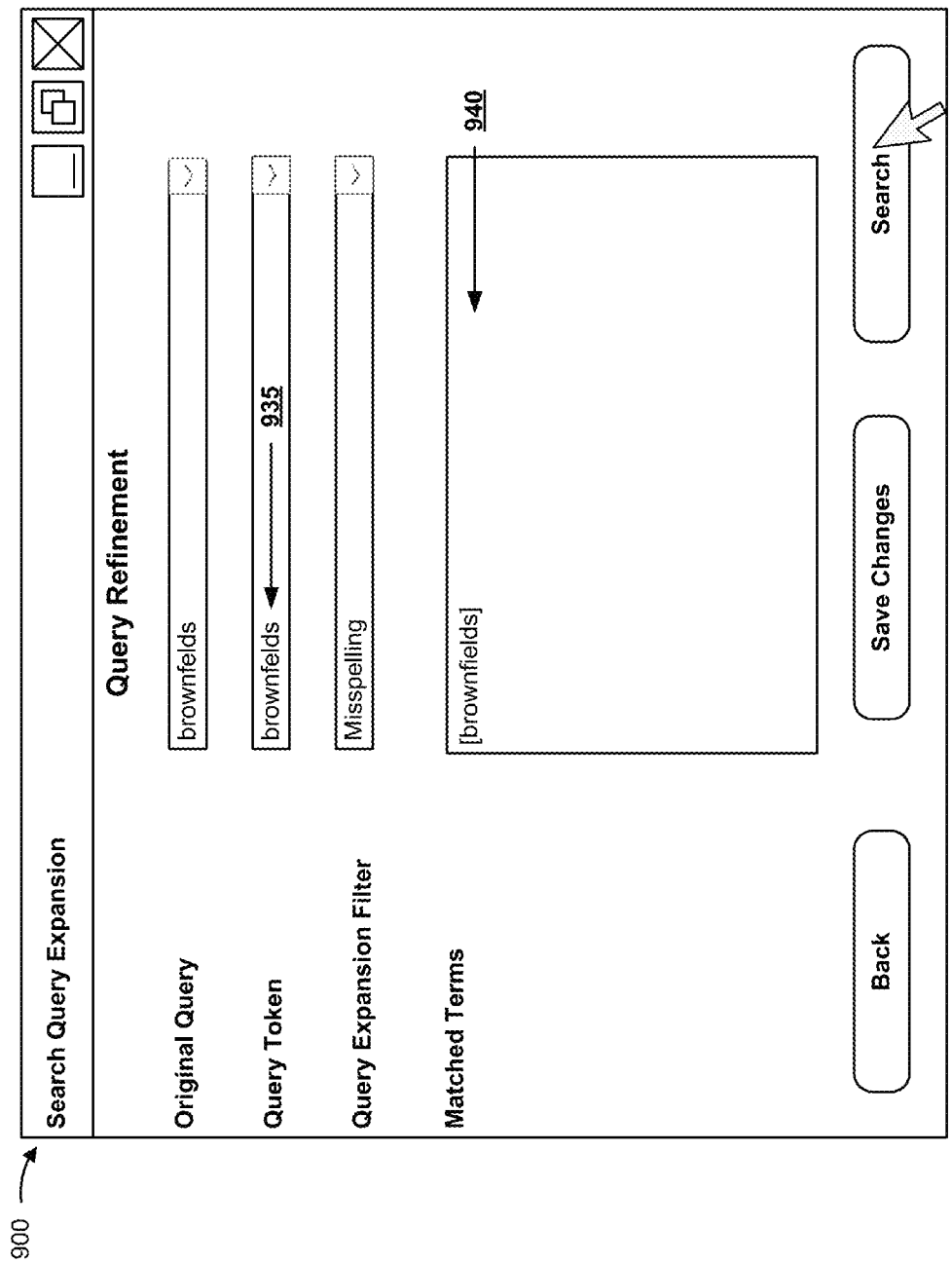

As shown in FIG. 9D, assume that the user changes the "design management web_sit" search query to a "brownfelds" search query. Based on this change, client device 210 updates the selected search term to "brownfelds," as shown by reference number 935 (e.g., since "brownfelds" is the only term included in the search query "brownfelds"). Assume that the user selects a "misspelling" search query expansion technique. Based on the user selections, client device 210 provides an indication of an expanded search query determined using the selected "brownfelds" term and the selected "misspelling" search query expansion technique. As shown by reference number 940, the expanded search query includes the properly spelled "brownfields" term. As further shown in FIG. 9D, assume that the user interacts with an input mechanism that causes client device 210 to provide search results.

As shown in FIG. 9E, and by reference number 945, client device 210 may provide information that identifies an initial search query and the number of text sections that matched the expanded initial search query. For example, for the search query "design and management of 'web sit'," there were 17 text sections that matched "design and management of 'web sit'," "web site," "ws," "web application," "data management," etc. (e.g., text sections that include at least one of the expanded search queries shown in FIGS. 9A, 9B, and 9C).

As shown by reference number 950, client device 210 may provide a list of ranked search results that identifies text sections that included the expanded initial search query. For example, for the initial search query "design and management of 'web sit'," Section 14 of the text was the most relevant match, followed by Section 10, Section 18, etc. As shown by reference number 955, client device 210 may provide information that identifies a percentage of the text sections that included the expanded initial search query. In this case, client device 210 has searched 41 text sections, and 17 of them matched the expanded initial search query "design and management of 'web sit'," for a total of 34.1%. As further shown in FIG. 9E, client device 210 may provide similar information for the other initial search queries, including "brownfelds," "property," and "report generation module."

As shown by reference number 960, client device 210 may provide an input mechanism (e.g., a button, a link, a menu item, etc.) that permits the user to cause client device 210 display clustered search results. Assume that the user interacts with this input mechanism.

As shown in FIG. 9F, assume that user interaction with the input mechanism causes client device 210 to provide search results as clusters of related results. As shown by reference number 965, assume that the most relevant cluster of results for the expanded initial search query "proprty" includes Section 3, Section 22, and Section 20. Assume that these search results had the highest relevancy score with respect to the "proprty" search query, as compared to the other clusters of search results. Further, assume that these search results had a higher mean similarity score with one another as compared to other search results. As further shown in FIG. 9F, client device 210 may provide similar information for the other initial search queries, including "design and management of 'web sit'," "brownfelds," and "report generation module." In this way, a user may customize a search query expansion process, and may view search results that are most relevant to a search query, as well as search results that are highly correlated to one another.

As indicated above, FIGS. 9A-9F are provided merely as an example. Other examples are possible and may differ from what was described with regard to FIGS. 9A-9F.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Also, as used herein, the terms "has," "have," "having," and the like are intended to be open-ended terms. Further, the phrase "based on" is intended to mean "based, at least in part, on" unless explicitly stated otherwise.

What is claimed is:

1. A device, comprising:
one or more processors to:
receive information that identifies a first search query and a second search query to be used to search a text, the first search query including a first multi-word term;
determine, based on user input, one or more search query expansion techniques to be performed to expand the first search query and the second search query;
perform the one or more search query expansion techniques to generate a first set of expanded search queries based on the first search query and terms included in the text to be searched,
the first set of expanded search queries including a second multi-word term;

search the text, using the first set of expanded search queries, to identify a first plurality of sections of the text that include a first expanded search query included in the first set of expanded search queries; and perform the one or more search query expansion techniques to generate a second set of expanded search queries based on the second search query and the text;

search the text, using the second set of expanded search queries, to identify a second plurality of sections of the text that include a second expanded search query included in the second set of expanded search queries;

determine a set of text sections included in both the first plurality of sections of the text and the second plurality of sections of the text;

determine a first relatedness score between a text section, included in the set of text sections, and the first plurality of sections of the text;

determine a second relatedness score between the text section and the second plurality of sections of the text;

remove the text section from one of the first plurality of sections of the text or the second plurality of sections of the text based on the first relatedness score and the second relatedness score; and provide search results that identify the first plurality of sections of the text and the second plurality of sections of the text based on searching the text.

2. The device of claim 1, where the one or more processors are further to:

provide information that identifies the first set of expanded search queries;

receive input that modifies the first set of expanded search queries to form a modified set of expanded search queries; and where the one or more processors, when searching the text using the first set of expanded search queries, are to:

search the text, using the modified set of expanded search queries, to identify the first plurality of sections of the text that include the first expanded search query included in the modified set of expanded search queries.

3. The device of claim 1, where the one or more processors are further to:

provide, via a user interface, information that identifies a plurality of search query expansion techniques, the plurality of search query expansion techniques including the one or more search query expansion techniques;

receive, via the user interface, a selection of the one or more search query expansion techniques; and where the one or more processors, when determining the one or more search query expansion techniques to be performed, are to:

determine the one or more search query expansion techniques to be performed based on receiving the selection.

4. The device of claim 1, where the one or more processors, when performing the one or more search query expansion techniques to generate the first set of expanded search queries, are to:

calculate a score based on a semantic relatedness between the first multi-word term and the second multi-word term;

determine that the score satisfies a threshold; and include the second multi-word term in the first set of expanded search queries based on determining that the score satisfies the threshold.

5. The device of claim 1, where the one or more search query expansion techniques include at least one of:

a misspelling analysis that indicates whether the first multi-word term and the second multi-word term are potential misspellings of one another;

a semantic relatedness analysis to identify a measure of semantic relatedness between the first multi-word term and the second multi-word term;

an alias analysis that indicates whether the first multi-word term and the second multi-word term are alias terms; or a containment analysis that indicates whether at least one word included in the second multi-word term is also included in the first multi-word term.

6. The device of claim 1, where the one or more processors, when determining the one or more search query expansion techniques to be performed, are to:

determine a plurality of search query expansion techniques to be performed;

where the one or more processors are further to:

receive information that identifies a first weight associated with a first search query expansion technique of the plurality of search query expansion techniques;

receive information that identifies a second weight associated with a second search query expansion technique of the plurality of search query expansion techniques; and where the one or more processors, when performing the one or more search query expansion techniques, are further to:

perform the first search query expansion technique using the first multi-word term and the second multi-word term;

perform the second search query expansion technique using the first multi-word term and the second multi-word term;

determine a score associated with the first multi-word term and the second multi-word term based on performing the first search query expansion technique and the second search query expansion technique, and further based on the first weight and the second weight; and selectively include the second multi-word term in the first set of expanded search queries based on the score.

7. The device of claim 1, where the one or more processors, when providing the search results, are to:

provide information that identifies the first plurality of sections of the text; and provide information that identifies the second plurality of sections of the text, where the first plurality of sections of the text and the second plurality of sections of the text do not include any sections in common.

8. A non-transitory computer-readable medium storing instructions, the instructions comprising:

one or more instructions that, when executed by one or more processors, cause the one or more processors to:

receive information that identifies a search query to be used to search a text;

provide information that identifies a plurality of search query expansion techniques for expanding the search query;

receive a selection of one or more search query expansion techniques, of the plurality of search query expansion techniques, to be performed to expand the search query;

perform the one or more search query expansion techniques to generate a set of expanded search queries based on the search query and terms included in the text to be searched;

search the text, using the set of expanded search queries, to identify a plurality of sections of the text that include an expanded search query included in the set of expanded search queries;

receive information that identifies one or more weight values to be applied to respective search query expansion techniques of the one or more search query expansion techniques;

calculate respective scores for each of the plurality of sections of the text based on the one or more weight values;

rank search results based on the respective scores; and provide the search results, in a manner that is based on the rank, that identify the plurality of sections of the text based on searching the text.

9. The non-transitory computer-readable medium of claim 8, where the search query includes a first multi-word term; and where the one or more instructions, that cause the one or more processors to perform the one or more search query expansion techniques to generate the set of expanded search queries, cause the one or more processors to:

identify a second multi-word term, included in the text, based on performing the one or more search query expansion techniques; and include the second multi-word term in the set of expanded search queries.

10. The non-transitory computer-readable medium of claim 8, where the one or more instructions further cause the one or more processors to:

provide, via a user interface, information that identifies the set of expanded search queries; and receive input that modifies the set of expanded search queries to generate a modified set of expanded search queries; and where the one or more instructions, that cause the one or more processors to search the text, cause the one or more processors to:

search the text, using the modified set of expanded search queries, to identify the plurality of sections of the text that include an expanded search query included in the modified set of expanded search queries.

11. The non-transitory computer-readable medium of claim 8, where the one or instructions further cause the one or more processors to:

calculate a plurality of similarity scores that indicate a similarity between different search results; and generate a set of search result clusters, that each include a subset of the search results, based on the plurality of similarity scores; and where the one or more instructions, that cause the one or more processors to provide the search results, cause the one or more processors to:

provide an indication of the set of search result clusters.

12. The non-transitory computer-readable medium of claim 8, where the search query is a first search query, where the set of expanded search queries is a first set of expanded search queries, where the plurality of sections of the text are a first plurality of sections of the text, where the expanded search query is a first expanded search query; and where the one or more instructions further cause the one or more processors to:

receive information that identifies a second search query to be used to search the text;

perform the one or more search query expansion techniques to generate a second set of expanded search queries based on the second search query and the text; and search the text, using the second set of expanded search queries, to identify a second plurality of sections of the text that include a second expanded search query included in the second set of expanded search queries; and where the one or more instructions, that cause the one or more processors to provide the search results, cause the one or more processors to:

provide, via a user interface, information that identifies the first plurality of sections of the text; and provide, via the user interface and while providing the information that identifies the first plurality of sections of the text, information that identifies the second plurality of sections of the text.

13. The non-transitory computer-readable medium of claim 8, where the one or more search query expansion techniques include at least one of:

a misspelling analysis that indicates whether a first term, included in the search query, is a potential misspelling of a second term included in the text, or whether the second term is a potential misspelling of the first term;

a semantic relatedness analysis that identifies a measure of semantic relatedness between the first term and the second term;

an alias analysis that indicates whether the first term and the second term are alias terms; or a containment analysis that indicates whether at least one word included in the first term is also included in the second term.

14. A method, comprising:

receiving, by a device, information that identifies a search query to be used to search a text;

determining, by the device, one or more search query expansion techniques to be performed to expand the search query;

performing, by the device, the one or more search query expansion techniques using the search query and terms included in the text to be searched;

determining, by the device, a plurality of expanded search queries based on performing the one or more search query expansion techniques, one or more of the plurality of expanded search queries being included in the text;

providing, by the device, information that identifies a set of expanded search queries included in the plurality of expanded search queries;

receiving, by the device, input that modifies the set of expanded search queries;

generating, by the device, a modified set of expanded search queries based on the input that modifies the set of expanded search queries;

searching the text, by the device and using the modified set of expanded search queries, to identify a plurality of sections of the text that include an expanded search query included in the modified set of expanded search queries;

obtaining, by the device, information that identifies one or more weight values to be applied to respective search query expansion techniques of the one or more search query expansion techniques;

calculating, by the device, respective scores for each of the plurality of sections of the text based on the one or more weight values;

ranking, by the device, search results based on the respective scores; and providing, by the device and in a manner based on the ranking, the search results that identify the plurality of sections of the text based on searching the text.

15. The method of claim 14, where the search query includes a first multi-word term; and where determining the plurality of expanded search queries comprises:

identifying a second multi-word term, included in the text, based on performing the one or more search query expansion techniques; and including the second multi-word term in the plurality of expanded search queries.

16. The method of claim 14, further comprising:

providing information that identifies a plurality of search query expansion techniques, the plurality of search query expansion techniques including the one or more search query expansion techniques; and detecting a user interaction with information that identifies the one or more search query expansion techniques of the plurality of search query expansion techniques; and where determining the one or more search query expansion techniques to be performed comprises:

determining the one or more search query expansion techniques to be performed based on detecting the user interaction.

17. The method of claim 14, where the one or more search query expansion techniques include a plurality of search query expansion techniques; and where the method further comprises:

providing information that identifies the plurality of search query expansion techniques;

receiving a selection of a search query expansion technique of the plurality of search query expansion techniques;

determining at least one expanded search query, of the plurality of expanded search queries, identified based on performing the selected search query expansion techniques;

including the at least one expanded search query in the set of expanded search queries; and where providing the information that identifies the set of expanded search queries comprises:

providing information that identifies the at least one expanded search query.

18. The method of claim 14, further comprising:

providing information that identifies a plurality of search queries, the plurality of search queries including the search query;

receiving a selection of the search query; and where providing the information that identifies the set of expanded search queries comprises:

providing the information that identifies the set of expanded search queries based on receiving the selection of the search query.

19. The method of claim 14, where receiving the input that modifies the set of expanded search queries comprises at least one of:

receiving input that adds a first search query to the set of expanded search queries, receiving input that removes a second search query from the set of expanded search queries, or receiving input that modifies a third search query included in the set of expanded search queries.

20. The method of claim 14, where the text to be searched is a text document.

* * * * *